United States Patent
Matsufuji et al.

(10) Patent No.: US 9,827,878 B1
(45) Date of Patent: Nov. 28, 2017

(54) SEAT SLIDING DEVICE

(71) Applicant: TOYOTA BOSHOKU KABUSHIKI KAISHA, Aichi (JP)

(72) Inventors: Tomio Matsufuji, Aichi (JP); Kosuke Taniguchi, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/602,524

(22) Filed: May 23, 2017

(30) Foreign Application Priority Data

May 26, 2016 (JP) ................................. 2016-105308

(51) Int. Cl.
*B60N 2/08* (2006.01)
*B60N 2/07* (2006.01)

(52) U.S. Cl.
CPC ............. *B60N 2/0818* (2013.01); *B60N 2/07* (2013.01); *B60N 2/0705* (2013.01); *B60N 2/0722* (2013.01); *B60N 2/08* (2013.01); *B60N 2/0875* (2013.01); *B60N 2/0881* (2013.01)

(58) Field of Classification Search
CPC .......... B60N 2/07; B60N 2/0722; B60N 2/08; B60N 2/0818; B60N 2/0875; B60N 2/0881
USPC ...................... 248/419, 424, 429; 297/344.1; 296/65.13, 65.15
See application file for complete search history.

(56) References Cited

U.S. PATENT DOCUMENTS

| | | | | |
|---|---|---|---|---|
| 7,314,204 B2* | 1/2008 | Kohmura | ............. | B60N 2/0705 248/430 |
| 8,360,383 B2* | 1/2013 | Kimura | ................ | B60N 2/0705 248/430 |
| 8,398,043 B2* | 3/2013 | Kimura | ................ | B60N 2/0705 248/424 |
| 8,469,327 B2* | 6/2013 | Hayashi | ............... | B60N 2/0705 248/424 |
| 8,616,515 B2* | 12/2013 | Hayashi | ............... | B60N 2/0705 248/424 |
| 9,463,716 B2* | 10/2016 | Hayashi | ................... | B60N 2/08 |
| 2003/0085330 A1* | 5/2003 | Lee | ........................ | B60N 2/071 248/430 |
| 2011/0108697 A1* | 5/2011 | Ito | ........................ | B60N 2/0707 248/429 |

(Continued)

FOREIGN PATENT DOCUMENTS

| JP | 2015-67142 | | 4/2015 | |
|---|---|---|---|---|
| JP | 6133187 B2 * | | 5/2017 | ............... B60N 2/07 |

(Continued)

*Primary Examiner* — Eret McNichols
(74) *Attorney, Agent, or Firm* — Greenblum & Bernstein, P.L.C.

(57) ABSTRACT

Provided is a seat sliding device. The seat sliding device comprises a fixed-side rail, a movable-side rail, a lock portion, a first elastically deforming portion, a second elastically deforming portion, a releasing member, and a protruding piece. The movable-side rail comprises an open-sectional portion including two side walls and a lid wall that couples the two side walls to each other. The lock portion is displaceable between a restraint position and a release position. The releasing member is engaged with the first elastically deforming portion. The protruding piece comprises an engaged portion with which the second elastically deforming portion engages.

2 Claims, 15 Drawing Sheets

(56) References Cited

U.S. PATENT DOCUMENTS

| | | | |
|---|---|---|---|
| 2011/0121154 A1* | 5/2011 | Kimura | B60N 2/0705 248/429 |
| 2012/0001049 A1* | 1/2012 | Selbold | B60N 2/0818 248/429 |
| 2012/0132778 A1* | 5/2012 | Nakamura | B60N 2/0705 248/429 |
| 2012/0145866 A1* | 6/2012 | Fukuda | B60N 2/0705 248/429 |
| 2013/0119221 A1* | 5/2013 | Hayashi | B60N 2/0705 248/429 |
| 2015/0069202 A1* | 3/2015 | Hayashi | B60N 2/08 248/429 |
| 2015/0090854 A1* | 4/2015 | Hayashi | B60N 2/0705 248/429 |
| 2015/0090855 A1 | 4/2015 | Arakawa et al. | |
| 2015/0291062 A1* | 10/2015 | Yamada | B60N 2/0705 384/47 |
| 2015/0306981 A1* | 10/2015 | Arakawa | B60N 2/0705 248/429 |
| 2017/0036569 A1* | 2/2017 | Sato | B60N 2/0705 |

FOREIGN PATENT DOCUMENTS

| | | | | |
|---|---|---|---|---|
| JP | 2017088038 A | * | 5/2017 | |
| WO | WO 2011136050 A1 | * | 11/2011 | B60N 2/0705 |
| WO | WO 2012011315 A1 | * | 1/2012 | B60N 2/0705 |
| WO | WO 2012081339 A1 | * | 6/2012 | B60N 2/0705 |

* cited by examiner

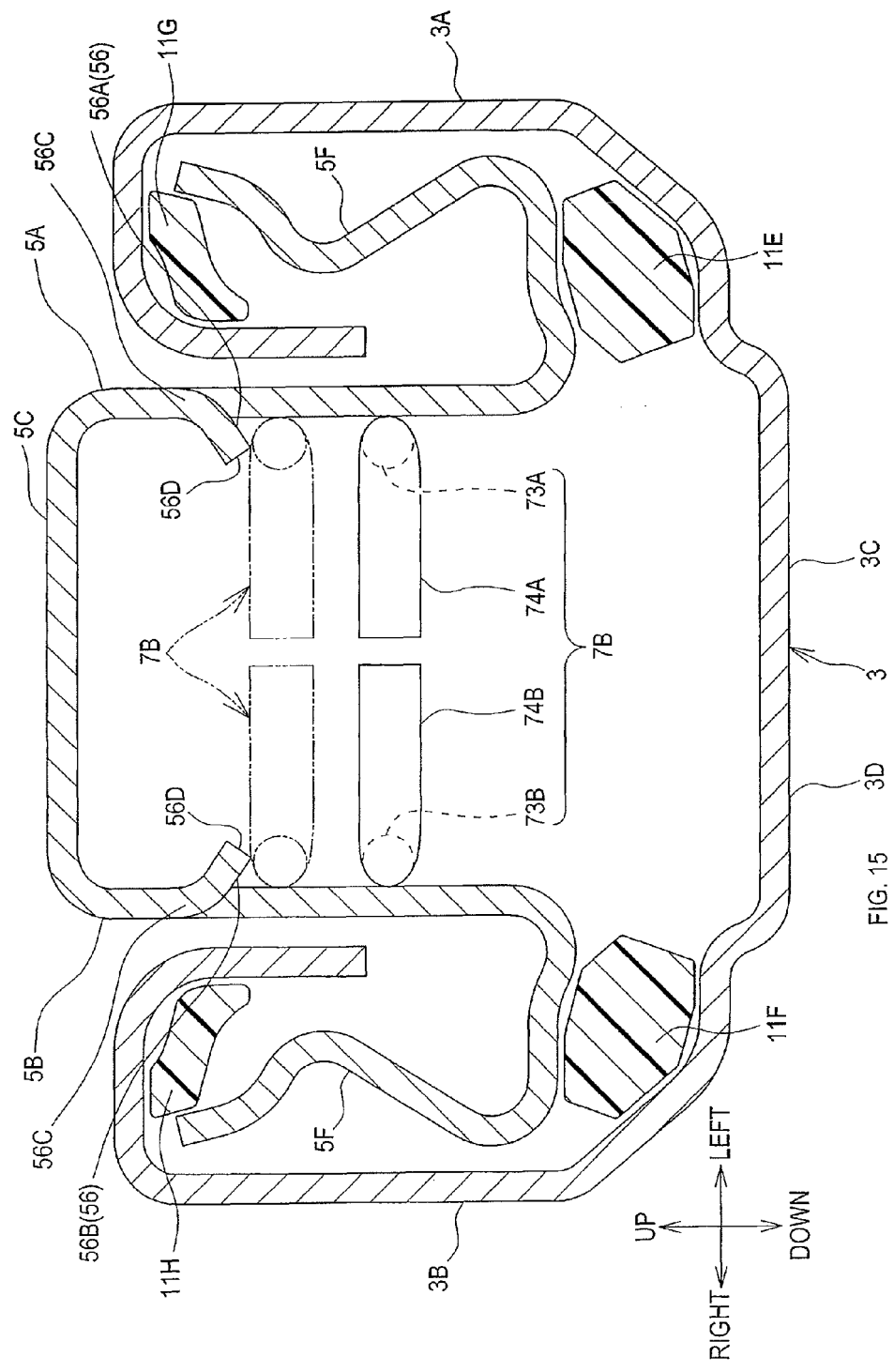

SEAT SLIDING DEVICE

CROSS-REFERENCE TO RELATED APPLICATIONS

This application claims the benefit of Japanese Patent Application No. 2016-105308 filed on May 26, 2016 with the Japan Patent Office, the entire disclosure of which is incorporated herein by reference.

BACKGROUND

The present disclosure relates to a seat sliding device that slidably supports a seat.

For example, a seat sliding device disclosed in Japanese Unexamined Patent Application Publication No. 2015-067142 (Patent Document 1) is configured such that a lock portion having a rectangular wave-like bent shape is displaced in a vertical direction approximately perpendicular to a longitudinal direction of a movable-side rail to thereby switch between a restrained state, in which sliding of the movable-side rail with respect to a fixed-side rail is restrained, and a released state, in which the restrained state is released.

The lock portion is supported by two linear elastically deforming portions provided at both ends of the lock portion across the lock portion. The lock portion and the two linear elastically deforming portions according to Patent Document 1 has an integral shape formed by applying bending processing to a single linear material.

A leading end portion of one linear elastically deforming portion (hereinafter also referred to as a first elastically deforming portion) of the two linear elastically deforming portions engages with a releasing member. A leading end portion of the other linear elastically deforming portion (hereinafter also referred to as a second elastically deforming portion) of the two linear elastically deforming portions engages with the movable-side rail.

The releasing member is a member configured to switch a deformed state of the first elastically deforming portion and the second elastically deforming portion. When the releasing member is operated directly or indirectly by a vehicle occupant or the like, the lock portion is brought into the restrained state or the released state.

SUMMARY

In the invention according to Patent Document 1, the movable-side rail is a metal member that comprises two side walls and a lid wall that couples the two side walls to each other and that is shaped so as to have a C-like or U-like open sectional shape. The second elastically deforming portion engages with a cut-and-raised piece provided to each of the two side walls constituting the movable-side rail.

The cut-and-raised piece is a portion formed through a "cutting and raising processing" as below. Specifically, first, a U-like-shaped or C-like-shaped through-hole is formed through part of the side wall by press working or the like. Next, a section surrounded by the through-hole is raised from the side wall while being bent into an approximately L-like shape by press working or the like.

The cut-and-raised piece according to Patent Document 1 is formed by being cut and raised from the side wall such that a joining portion at which the cut-and-raised piece and the side wall are joined together is positioned vertically lower than a leading-end portion of the cut-and-raised piece, i.e., positioned on a fixed-side rail side.

In the meantime, assuming that a length from the joining portion to the leading-end portion along the L-like-shaped cut-and-raised piece is referred to as a "required cut-and-raised length", a portion in which the cut-and-raised piece is provided is inevitably to contain a through-hole (hereinafter referred to as a cut-and-raised hole) having a length larger than that of the "required cut-and-raised length".

Thus, in the invention according to Patent Document 1, it is difficult to make a vertical dimension of the movable-side rail smaller than the "required cut-and-raised length".

Specifically, if the vertical dimension of the movable-side rail is made smaller than the "required cut-and-raised length", the cut-and-raised hole is inevitably to extend over the lid wall. Thus, it is feared that a geometrical moment of inertia of the movable-side rail becomes smaller to thereby reduce the flexural rigidity of the movable-side rail significantly. Accordingly, it is difficult to reduce the vertical dimension of the movable-side rail.

The present disclosure provides a seat sliding device in which reduction of the vertical dimension of the movable-side rail is enabled.

In the present disclosure, a seat sliding device that slidably supports a seat comprises a fixed-side rail, a movable-side rail, a lock portion, a first elastically deforming portion, a second elastically deforming portion, a releasing member, and a protruding piece. The movable-side rail is slidable with respect to the fixed-side rail and is configured to support the seat. The movable-side rail comprises an open-sectional portion comprising two side walls and a lid wall that couples the two side walls to each other. The lock portion is displaceable between a restraint position, in which sliding of the movable-side rail with respect to the fixed-side rail is restrained, and a release position, in which such restraint is eliminated. The first elastically deforming portion is elastically deformable between a state supporting the lock portion in the restraint position and a state supporting the lock portion in the release position. The first elastically deforming portion is housed in the movable-side rail. The second elastically deforming portion is housed in the movable-side rail so as to be on a side opposite the first elastically deforming portion across the lock portion. The second elastically deforming portion is elastically deformable between a state supporting the lock portion in the restraint position and a state supporting the lock portion in the release position. The releasing member is configured to switch a deformed state of the first elastically deforming portion and the second elastically deforming portion. The releasing member extends from a side of the first elastically deforming portion toward one longitudinal end side of the movable-side rail, and is engaged with the first elastically deforming portion. The protruding piece is provided to at least one side wall of the two side walls and protrudes toward the other side wall. The protruding piece comprises an engaged portion with which the second elastically deforming portion engages. The protruding piece is configured such that a joining portion at which the protruding piece and the side wall are joined together is positioned on the other longitudinal end side of the movable-side rail with respect to a leading-end portion of the protruding piece. The side wall contains, in a specified area thereof ranging from the joining portion toward the one longitudinal end side, a through-hole penetrating the side wall.

Due to such a configuration, an effect described below, for example, can be obtained. Specifically, when the seat sliding device according to the present disclosure is mounted to a vehicle, such as a car, such that a direction approximately parallel to a direction from a side of the lid wall toward an open side of the movable-side rail corresponds to a vertical direction, a direction of the "required cut-and-raised length" corresponds to a horizontal direction, i.e., a longitudinal direction of the movable-side rail.

Accordingly, it can be inhibited that the through-hole corresponding to the cut-and-raised hole extends over the lid wall, and thus, reduction of a vertical dimension of the movable-side rail is enabled while inhibiting reduction of the flexural rigidity of the movable-side rail.

Furthermore, since the protruding piece is formed such that the joining portion at which the protruding piece and the side wall are joined together is positioned on the other longitudinal end side of the movable-side rail with respect to the leading-end portion, it can be inhibited that the protruding piece becomes an obstacle when the second elastically deforming portion engages with the engaged portion and when the second elastically deforming portion is operated (elastically deformed).

The engaged portion may be a U-like-shaped recess portion recessed in a direction from an upper end of the protruding piece toward an open side of the movable-side rail. An engaging portion in the second elastically deforming portion that engages with the engaged portion may be configured to run through the engaged portion in a thickness direction of the protruding piece.

BRIEF DESCRIPTION OF THE DRAWINGS

An example embodiment of the present disclosure will be described below with reference to the accompanying drawings, in which:

FIG. 15 is a sectional view taken along a line XV-XV in FIG. 10.

DETAILED DESCRIPTION OF THE PREFERRED EMBODIMENTS

Figure 1:
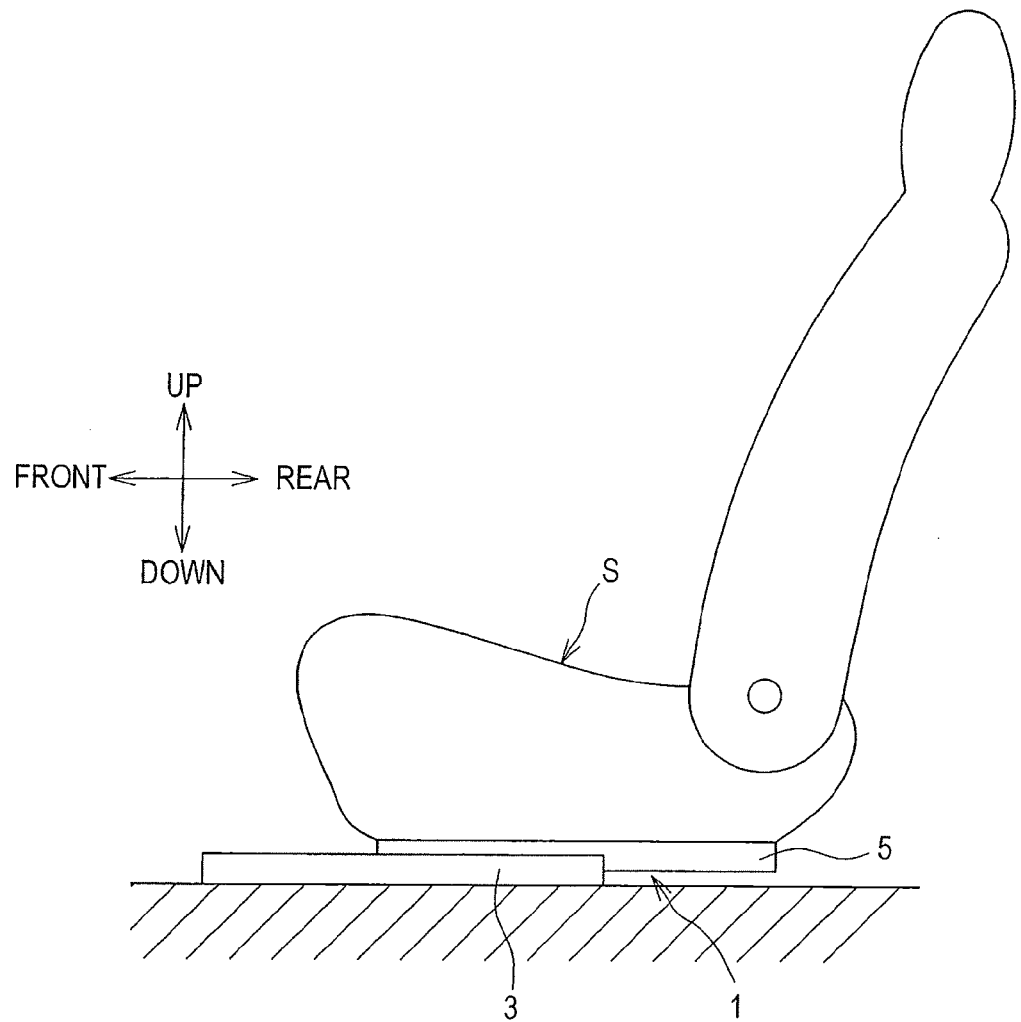
FIG. 1 is a view showing an assembled state of a seat sliding device according to one embodiment.

An "embodiment" to be described below shows one example of embodiments belonging to the technical scope of the present disclosure. That is, invention-specifying matters recited in the claims are not limited to specific configurations, structures, and so on shown in the present embodiment.

Arrows and the like on the drawings indicating directions are intended to facilitate understanding of relationships between the drawings. The arrows and the like (directions) on the drawings do not limit the scope of the present disclosure.

A member or a portion described at least with a reference numeral attached thereto is at least one in number except in the presence of indication such as "a plurality of" and "two or more".

In the present embodiment, an explanation will be given about a seat sliding device that slidably supports a rear seat of a car. As shown in FIG. 1, a seat sliding device 1 is provided to a vertically lower end of a seat S.

1. Overview of Seat Sliding Device

Figure 2:
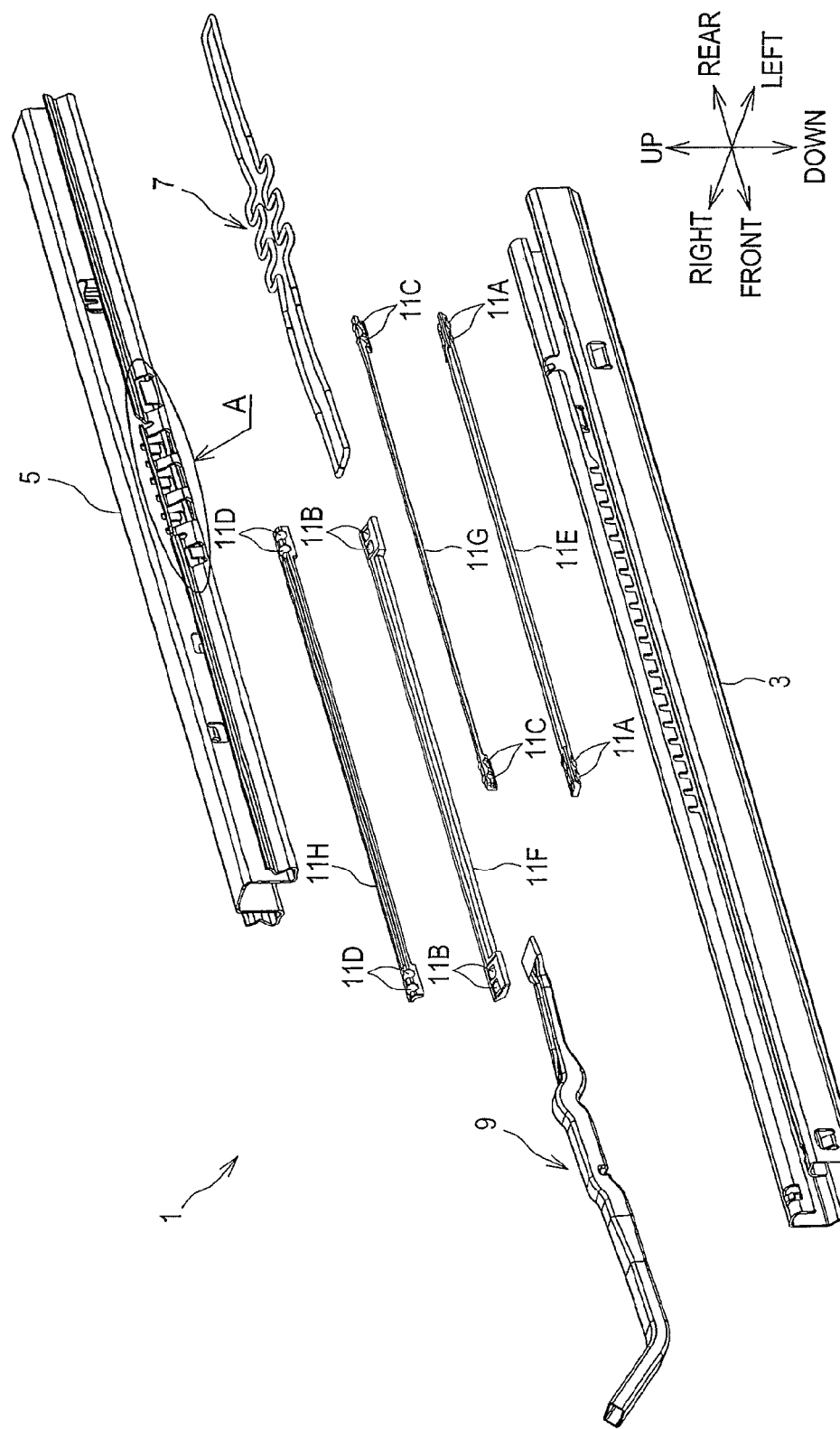
FIG. 2 is an exploded perspective view of the seat sliding device according to one embodiment.

As shown in FIG. 2, the seat sliding device 1 comprises at least a fixed-side rail 3, a movable-side rail 5, a lock spring 7, and a releasing member 9. As shown in FIG. 1, the fixed-side rail 3 is fixed on a floor panel or the like of a vehicle such that a longitudinal direction of the fixed-side rail 3 corresponds to a front-rear direction of the vehicle (a front-rear direction of the seat).

The movable-side rail 5 is assembled to the seat S and supports the seat S. Further, the movable-side rail 5 is assembled to the fixed-side rail 3 so as to be slidable with respect to the fixed-side rail 3. The seat S is slidable, integrally with the movable-side rail 5, with respect to the fixed-side rail 3 in a vehicle front-rear direction.

The seat sliding device 1 is provided to each width-direction side of the seat S. The seat S is assembled to the vehicle via the two seat sliding devices 1 per seat. The width direction of the seat S corresponds to a vehicle width direction, i.e., a vehicle left-right direction.

The lock spring 7 is a member configured to restrain sliding of the movable-side rail 5 with respect to the fixed-side rail 3. The releasing member 9 is a member configured to eliminate such restraint by the lock spring 7. The releasing member 9 is operated directly or indirectly by a vehicle occupant.

2. Overview of Fixed-Side Rail and Movable-Side Rail

Figure 3:
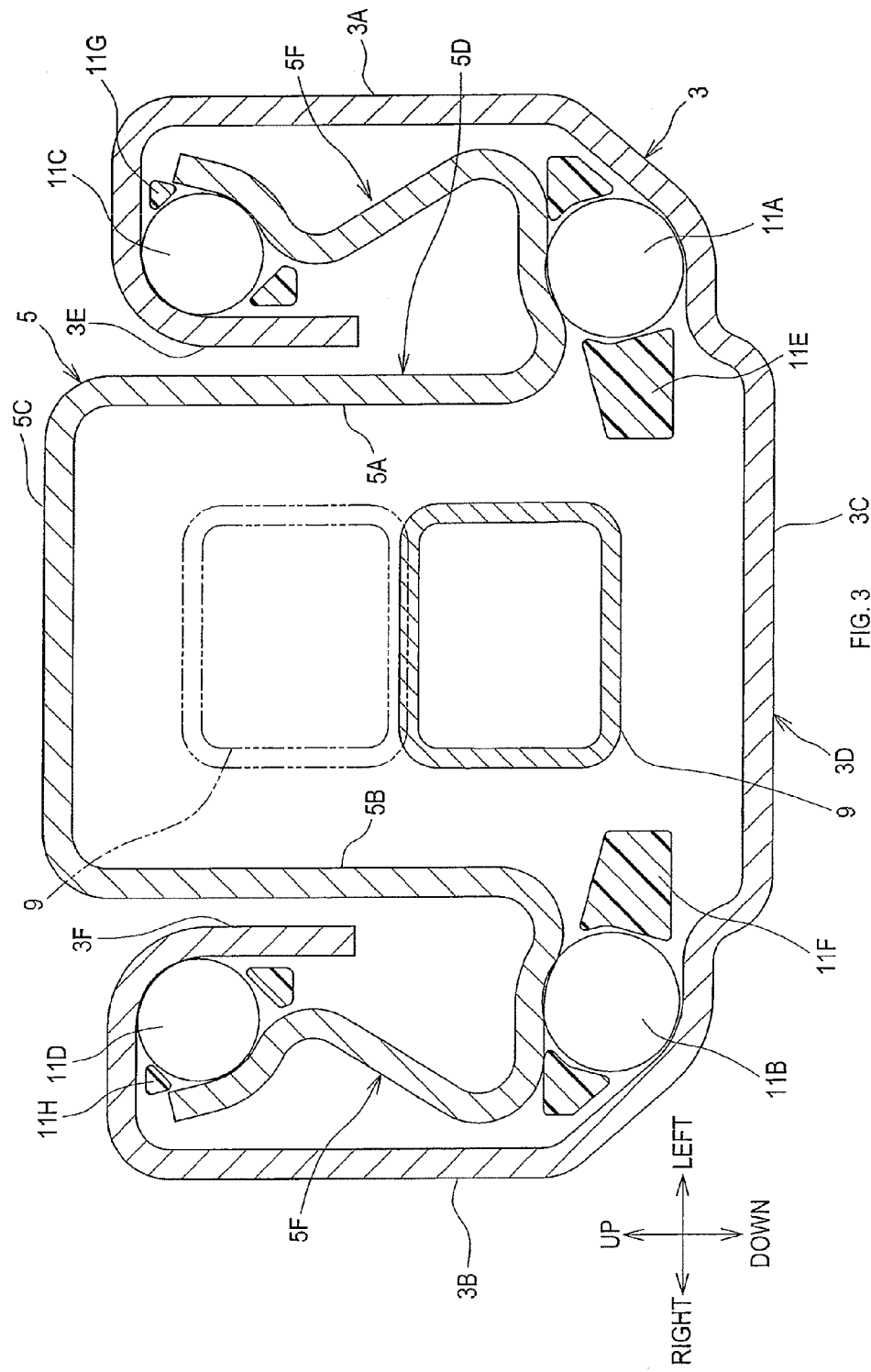
FIG. 3 is a sectional view of the seat sliding device according to one embodiment (a sectional view viewed in a direction perpendicular to a longitudinal direction)

As shown in FIG. 3, the fixed-side rail 3 comprises an open-sectional portion 3D configured to have a C-like shape or a U-like shape. The open-sectional portion 3D comprises two side walls 3A and 3B and a lid wall 3C that couples the two side walls 3A and 3B to each other. The two side walls 3A and 3B and the lid wall 3C extend in a strip-like manner in the longitudinal direction of the fixed-side rail 3.

The fixed-side rail 3 is a metal member. Specifically, the fixed-side rail 3 is formed by pressing a rolled steel plate. The two side walls 3A and 3B and the lid wall 3C (i.e., the open-sectional portion 3D) are of metal and integrally formed.

The movable-side rail 5 comprises an open-sectional portion 5D and two track portions 5F. The open-sectional portion 5D is a portion configured to have a C-like shape or a U-like shape, and comprises two side walls 5A and 5B and a lid wall 5C that couples the two side walls 5A and 5B to each other. The seat S is assembled on the lid wall 5C of the movable-side rail 5.

The two track portions 5F are provided on both width-direction sides (both left-right-direction sides) of the open-sectional portion 5D across the open-sectional portion 5D, and are in rolling contact with a plurality of rolling elements 11A to 11D. The movable-side rail 5 is a metal member. Specifically, the movable-side rail 5 is formed by pressing a rolled steel plate.

The two side walls 5A and 5B, the lid wall 5C, and the two track portions 5F extend in a longitudinal direction of the movable-side rail 5. The two side walls 5A and 5B and the lid wall 5C (i.e., the open-sectional portion 5D) and the two track portions 5F are of metal and integrally formed.

A direction approximately parallel to a direction from a side of the lid wall 5C toward an open side of the movable-side rail 5 is hereinafter referred to as a "height direction". The "height direction" corresponds to a vertical direction (an up-down direction) in a state in which the seat sliding device 1 is assembled to the vehicle.

Load acting on the movable-side rail 5 is received by the fixed-side rail 3 via the plurality of rolling elements 11A to 11D. Such load comprises the force of gravity acting on the seat S, the force of gravity acting on the vehicle occupant sitting on the seat S, and so on.

The rolling elements 11A to 11D are spheres such as steel balls. The rolling elements 11A to 11D are each in rolling contact with the fixed-side rail 3 and the movable-side rail 5 (specifically, the two track portions 5F). Such a configuration allows the movable-side rail 5 to be slidable in the longitudinal direction (the front-rear direction), while limiting displacement with respect to the fixed-side rail 3 in the width direction (left-right direction).

As shown in FIG. 2, each of the rolling elements 11A to 11D respectively provided to retainers 11E to 11H is two in number for each longitudinal end thereof. The rolling elements 11A to 11D are respectively retained by the retainers 11E to 11H.

3. Overview of Lock Spring

Figure 4:
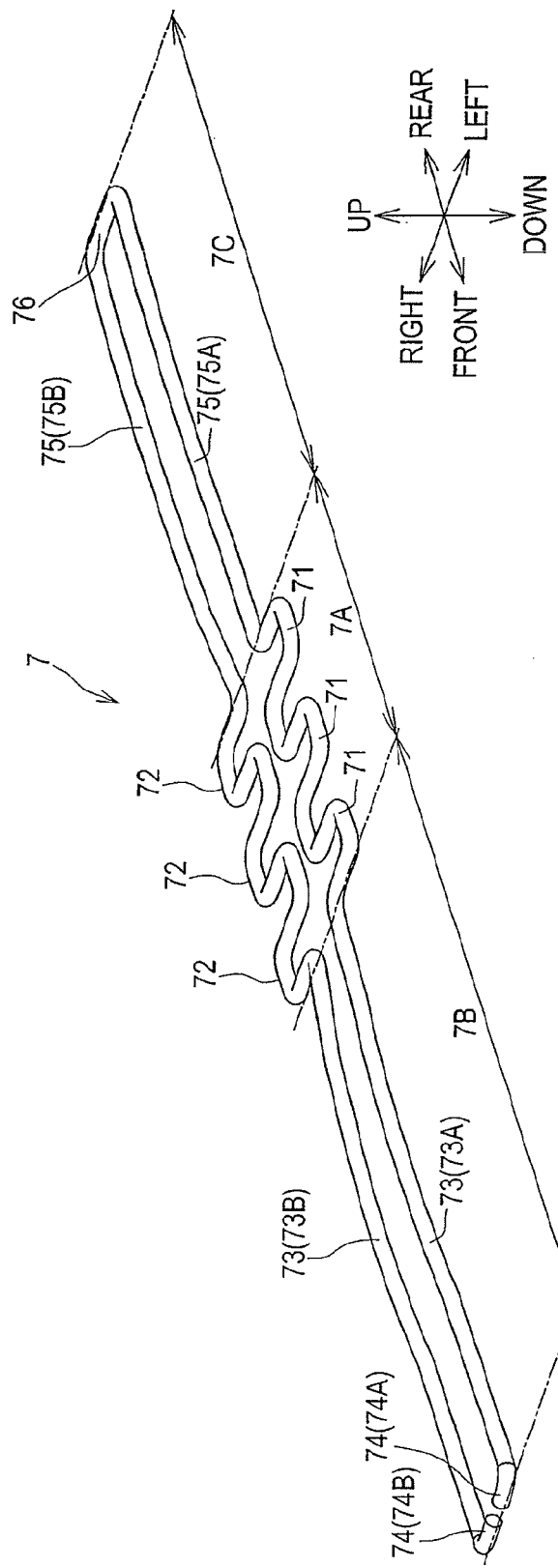
FIG. 4 is a perspective view of a lock spring according to one embodiment.

As shown in FIG. 4, the lock spring 7 comprises a lock portion 7A, a first elastically deforming portion 7B, and a second elastically deforming portion 7C.

The lock portion 7A is a portion configured to restrain sliding of the movable-side rail 5 with respect to the fixed-side rail 3. The first elastically deforming portion 7B and the second elastically deforming portion 7C are portions configured to displaceably support the lock portion 7A.

<Lock Portion>

Figure 5:
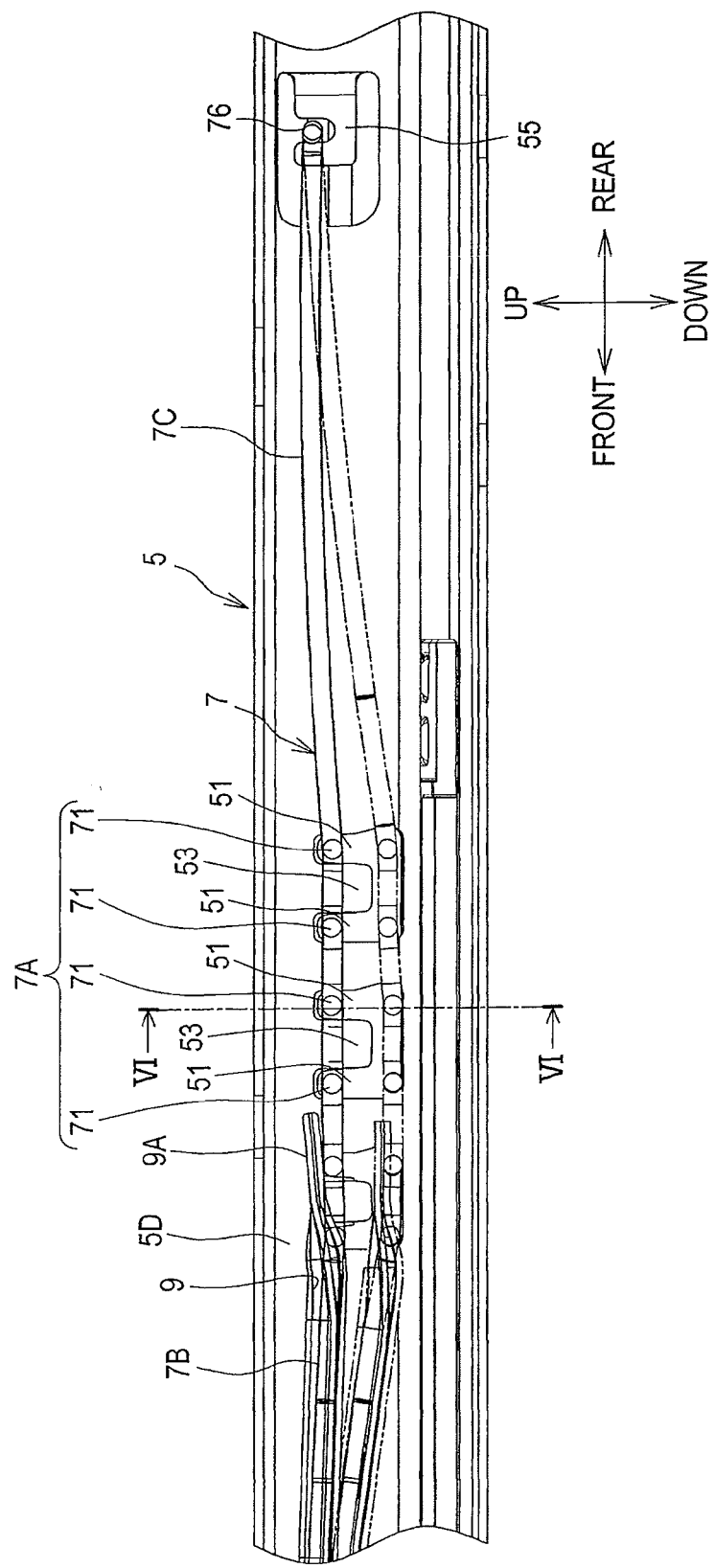
FIG. 5 is a partial vertical sectional view of the seat sliding device according to one embodiment cut at a width-direction center thereof.
Figure 6:
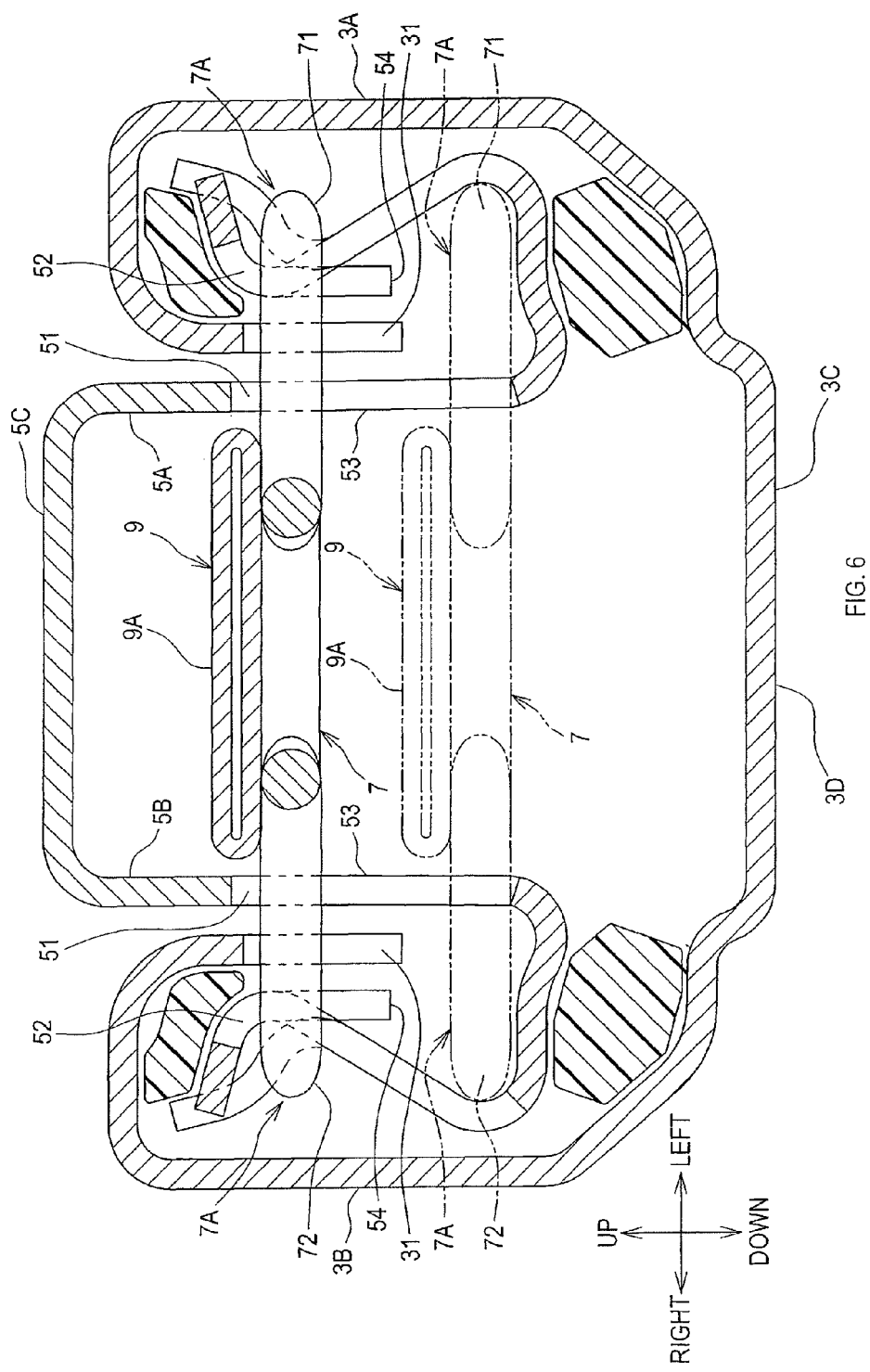
FIG. 6 is a sectional view taken along a line VI-VI in FIG. 5.

As shown in FIGS. 5 and 6, the lock portion 7A is displaceable between a restraint position, in which sliding of the movable-side rail 5 with respect to the fixed-side rail 3 is restrained, and a release position, in which such restraint is eliminated.

In the present embodiment, a position of the lock portion 7A indicated by solid lines in FIGS. 5 and 6 is the restraint position. A position of the lock portion 7A indicated by chain double-dashed lines in FIGS. 5 and 6 is the release position. The lock portion 7A is displaceable in the height direction. Within a displaceable range of the lock portion 7A, a vertically upper position is the restraint position, and a vertically lower position is the release position.

As shown in FIG. 4, the lock portion 7A comprises a plurality of engagement portions 71 and 72. Each of the engagement portions 71 and 72 is a portion having a rectangular wave-like shape formed by a linear material bent into a C-like shape or a U-like shape.

As shown in FIG. 6, each engagement portion 71 protrudes toward the side walls 3A and 5A (in the present embodiment, to the left). Each engagement portion 72 protrudes toward the side walls 3B and 5B (in the present embodiment, to the right).

Figure 7:
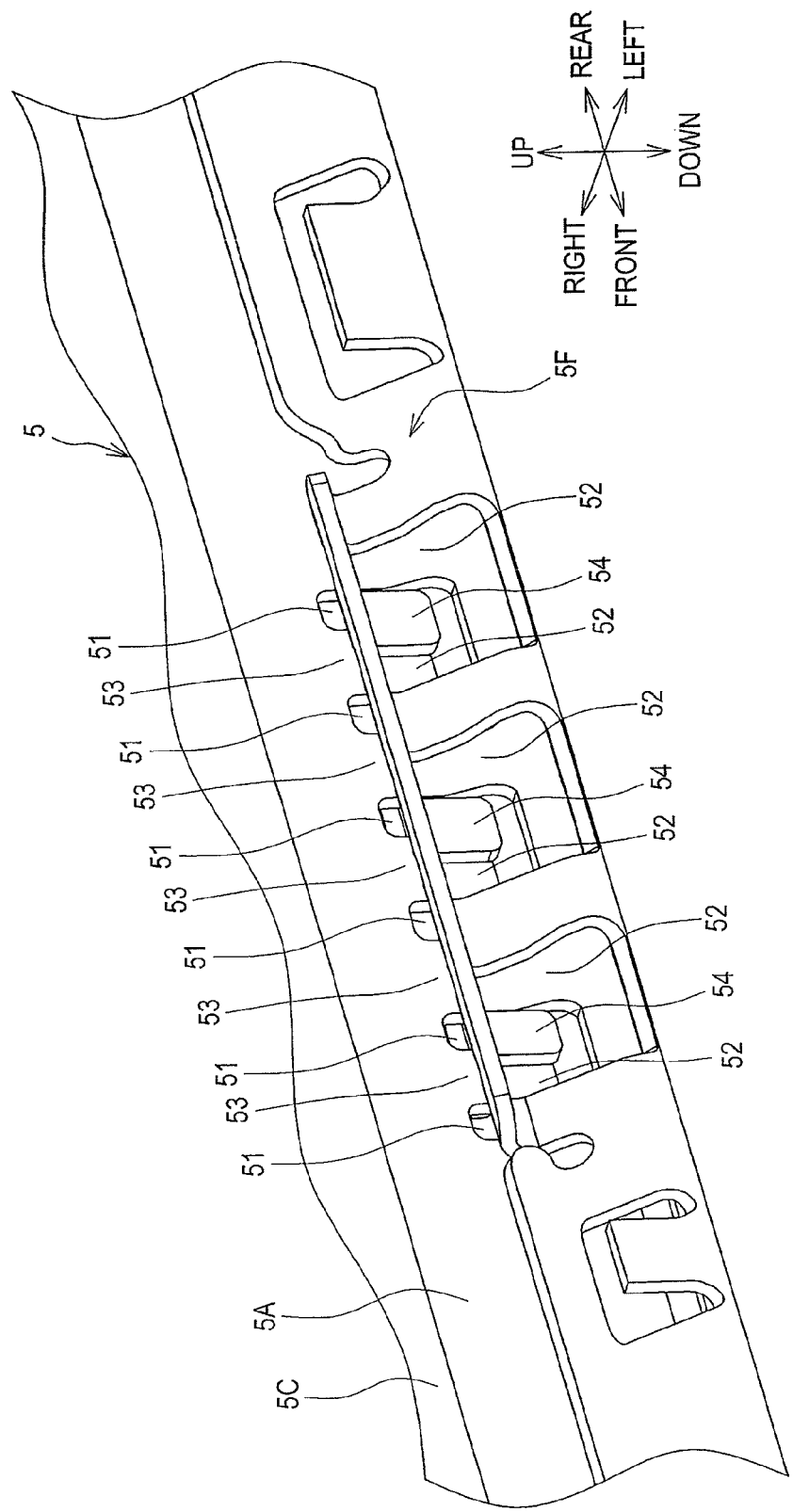
FIG. 7 is an enlarged perspective view of part of a movable-side rail (a part A in FIG. 2) according to one embodiment.

As shown in FIG. 7, each of the side walls 5A and 5B comprises a plurality of cut-outs 51 arranged at a longitudinally middle portion thereof (only the side wall 5A is shown in FIG. 7). Each track portion 5F comprises a plurality of cut-outs 52 arranged at a longitudinally middle portion thereof (only one of the track portions 5F is shown in FIG. 7). As shown in FIG. 6, the plurality of cut-outs 51 are arranged to each of the side walls 5A and 5B. The plurality of cut-outs 52 are arranged to each of the two track portions 5F.

As shown in FIG. 6, the respective cut-outs 51 and 52 are through-holes, into which the linear material constituting the engagement portions 71 and 72 can fit. The through-holes constituting the cut-outs 51 and 52 each have a shape like an elongated hole extending in the vertical direction (the height direction).

As shown in FIG. 6, in a state in which each of the engagement portions 71 and 72 fits into the corresponding cut-out 51, each of the engagement portions 71 and 72 fits into the corresponding cut-out 52. Thus, each of the engagement portions 71 and 72 is engaged with an engagement piece 53 provided between the adjacent cut-outs 51 and with an engagement piece 54 provided between the adjacent cut-outs 52.

Figure 8:
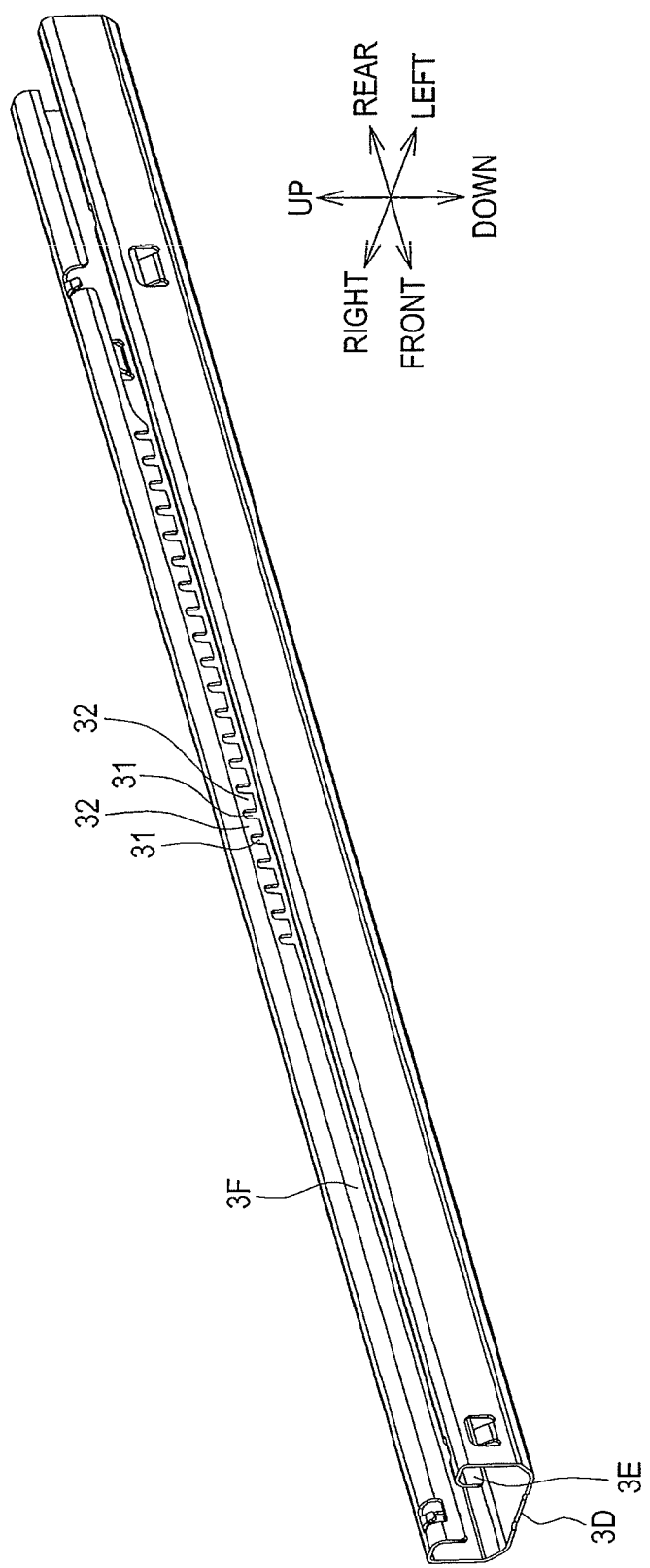
FIG. 8 is a perspective view of a fixed-side rail according to one embodiment.

As shown in FIG. 3, provided facing the two side walls 5A and 5B of the movable-side rail 5 are respectively opposing walls 3E and 3F of the fixed-side rail 3. As shown in FIG. 8, the opposing walls 3E and 3F are strip-plate-like portions extending in the longitudinal direction, and are each formed integrally with the open-sectional portion 3D by press forming.

Each of the opposing walls 3E and 3F comprises a plurality of cut-outs 31 arranged at a longitudinally middle portion thereof. Each cut-out 31 is a concave recess into which the linear material constituting the engagement portions 71 and 72 can fit. The recess constituting each cut-out 31 is like a U-shaped elongated hole extending in the vertical direction (the height direction).

In a state in which each of the engagement portions 71 and 72 fits into the corresponding cut-out 31, an engagement piece 32 provided between the adjacent cut-outs 31 (see FIG. 8) and the corresponding engagement portion 71 or 72 can be engaged with each other.

A position in which the engagement portions 71 and 72 are engaged with the engagement pieces 53, 54, and 32 is the restraint position, whereas a position in which the engagement portions 71 and 72 are spaced apart from the engagement pieces 53, 54, and 32 (i.e., spaced apart from the cut-outs 51, 52, and 31) is the release position.

<First and Second Elastically Deforming Portions>

As shown in FIG. 4, in the lock spring 7, the first elastically deforming portion 7B is positioned at one longitudinal end side of the lock portion 7A (in the present embodiment, at a vehicle front side). The second elastically deforming portion 7C is positioned at the other longitudinal end side of the lock portion 7A (in the present embodiment, at a vehicle rear side).

As shown in FIG. 5, the first elastically deforming portion 7B and the second elastically deforming portion 7C are housed in the open-sectional portion 5D, and are elastically deformable between a state supporting the lock portion 7A in the restraint position and a state supporting the lock portion 7A in the release position.

Figure 9:
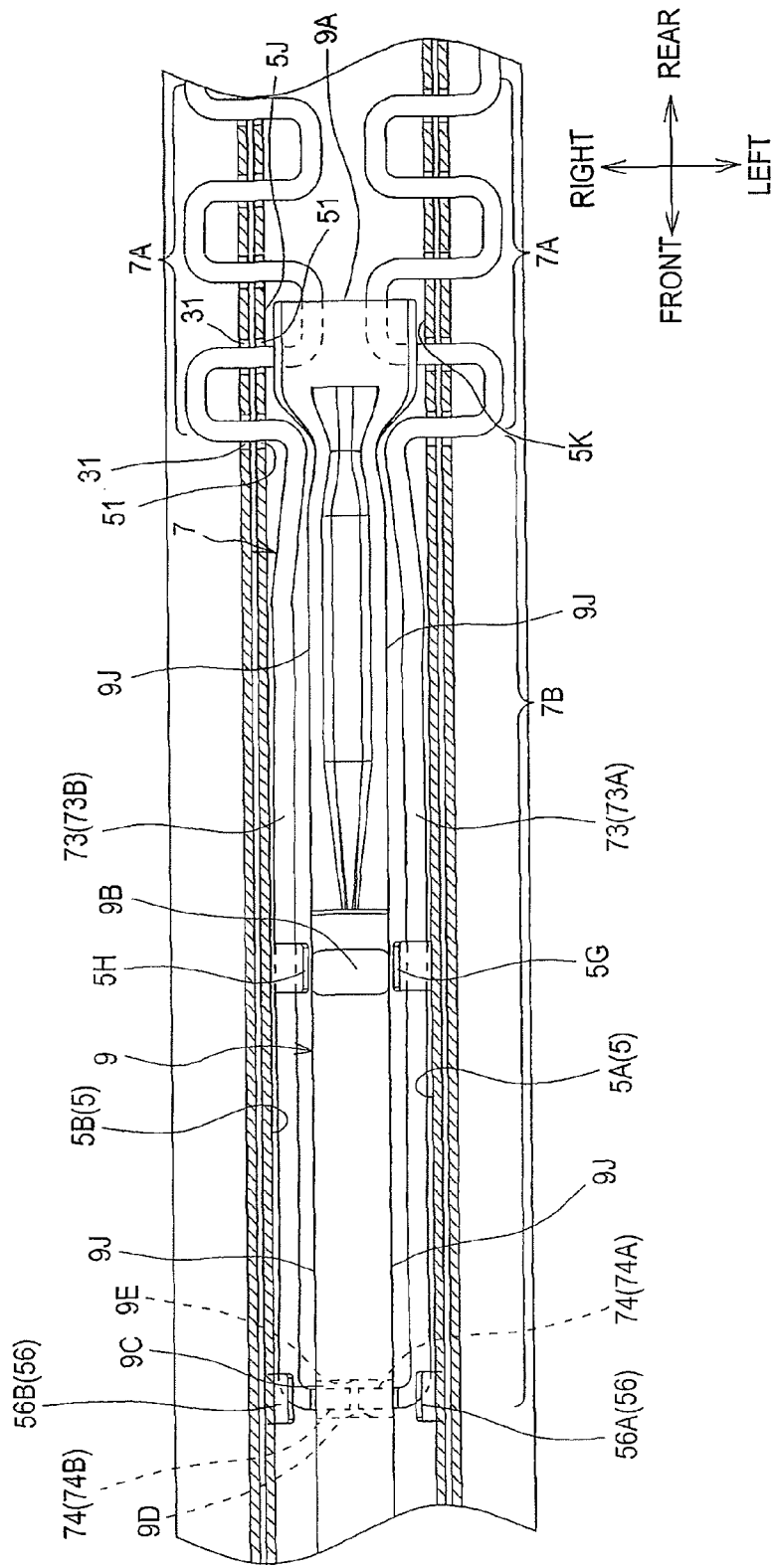
FIG. 9 is a view showing a state in which a lid wall is imaginarily removed from the movable-side rail according to one embodiment, viewed in a direction of an arrow C in FIG. 10.

As shown in FIG. 4, the first elastically deforming portion 7B comprises a linear portion 73 and an engaging portion 74. The linear portion 73 is an elastically deformable portion extending in a direction approximately parallel to the longitudinal direction of the movable-side rail 5. As shown in FIGS. 4 and 9, the linear portion 73 comprises a first linear portion 73A and a second linear portion 73B.

As shown in FIGS. 4 and 9, in the first elastically deforming portion 7B, the first linear portion 73A and the second linear portion 73B are respectively provided at one width-direction side and at the other width-direction side across the releasing member 9.

The engaging portion 74 is a portion protruding from an extending-direction leading end portion of the linear portion 73, in a direction approximately perpendicular to the extending direction. The engaging portion 74 comprises a first engaging portion 74A provided to the first linear portion 73A and a second engaging portion 74B provided to the second linear portion 73B.

The first engaging portion 74A protrudes from a leading end of the first linear portion 73A toward the second linear portion 73B. The second engaging portion 74B protrudes from a leading end of the second linear portion 73B toward the first linear portion 73A.

The engaging portion 74 is formed by plastically processing (bending) the leading end side of the linear portion 73. The engaging portion 74 and the linear portion 73 are formed integrally with each other. A leading end of the first engaging portion 74A and a leading end of the second engaging portion 74B are displaceable in the width direction so as to come in contact with each other or so as to be spaced apart from each other.

As shown in FIG. 4, the second elastically deforming portion 7C is configured approximately similarly to the first elastically deforming portion 7B. The second elastically deforming portion 7C comprises a linear portion 75 and an engaging portion 76. The linear portion 75 is an elastically deformable portion extending in a direction approximately parallel to the longitudinal direction of the movable-side rail 5 from the lock portion 7A toward the other longitudinal end side (the vehicle rear side). The linear portion 75 comprises a first linear portion 75A and a second linear portion 75B.

The first linear portion 75A is provided at one width-direction side of the lock spring 7, and is approximately parallel to an extending direction of the first linear portion 73A. The second linear portion 75B is provided at the other width-direction side of the lock spring 7, and is approximately parallel to an extending direction of the second linear portion 73B.

The engaging portion 76 is a portion protruding from extending-direction leading end portions of the linear portions 75A and 75B, in a direction approximately perpendicular to the extending direction. The engaging portion 76 is configured so as to couple the extending-direction leading end of the first linear portion 75A and the extending-direction leading end of the second linear portion 75B to each other.

The linear portions 75A and 75B are integrated with each other via the engaging portion 76 at their extending-direction leading end side. The first elastically deforming portion 7B, the lock portion 7A, and the second elastically deforming portion 7C are one piece formed by applying bending processing to a single linear material.

4. Structure, etc., of Releasing Member

Figure 10:
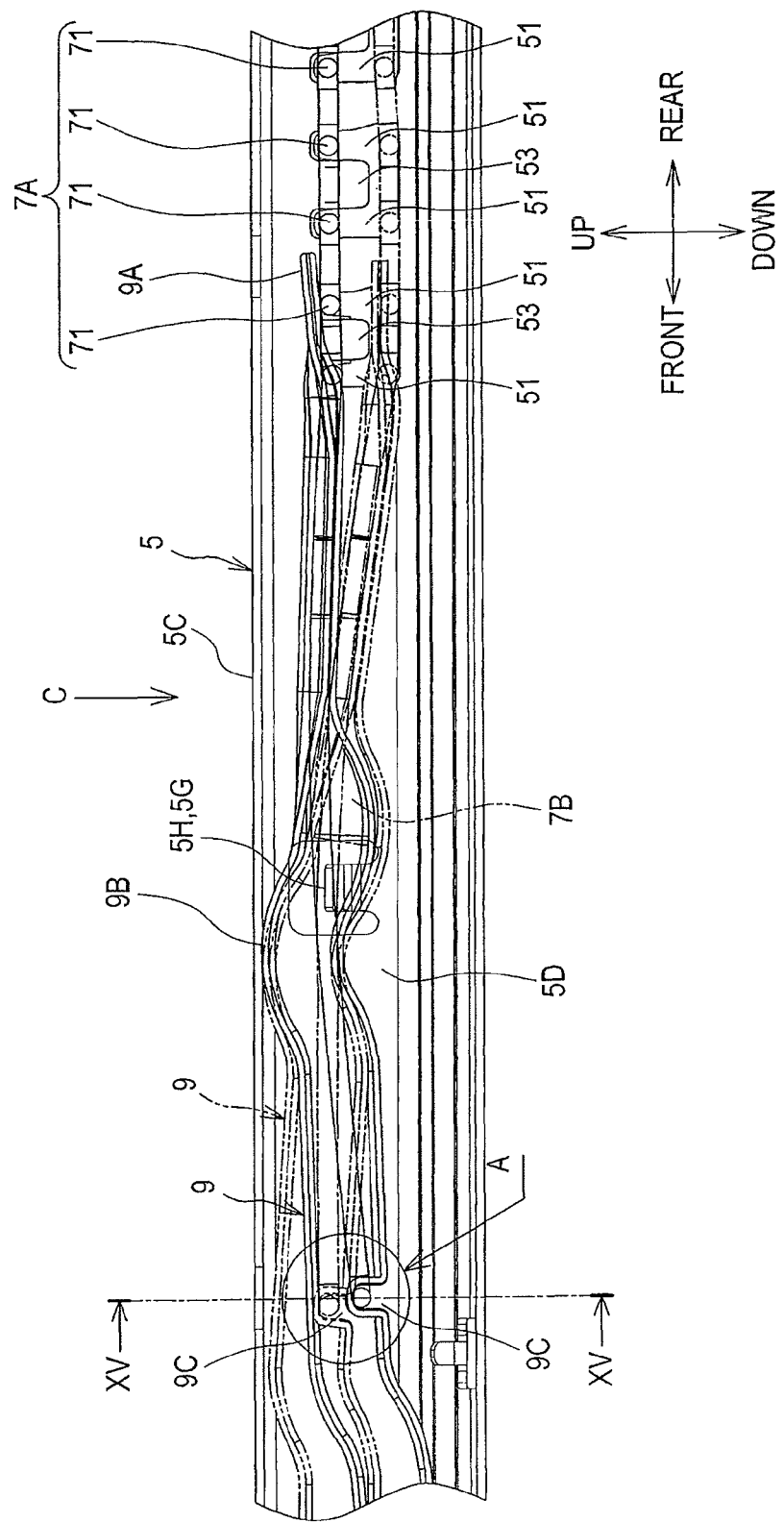
FIG. 10 is an explanatory view showing a deformed state of the lock spring according to one embodiment and operation of a releasing member.

As shown in FIG. 10, the releasing member 9 is a member configured to switch a deformed state of the first elastically deforming portion 7B and the second elastically deforming portion 7C.

The releasing member 9 is a lever-like-shaped member extending from a side of the first elastically deforming portion 7B toward one longitudinal end side of the movable-side rail 5 (in the present embodiment, toward the vehicle front side). The releasing member 9 is provided between the first elastically deforming portion 7B and the lid wall 5C in the open-sectional portion 5D. In other words, the releasing member 9 extends toward the vehicle front side with respect to the lock portion 7A.

Figure 11:
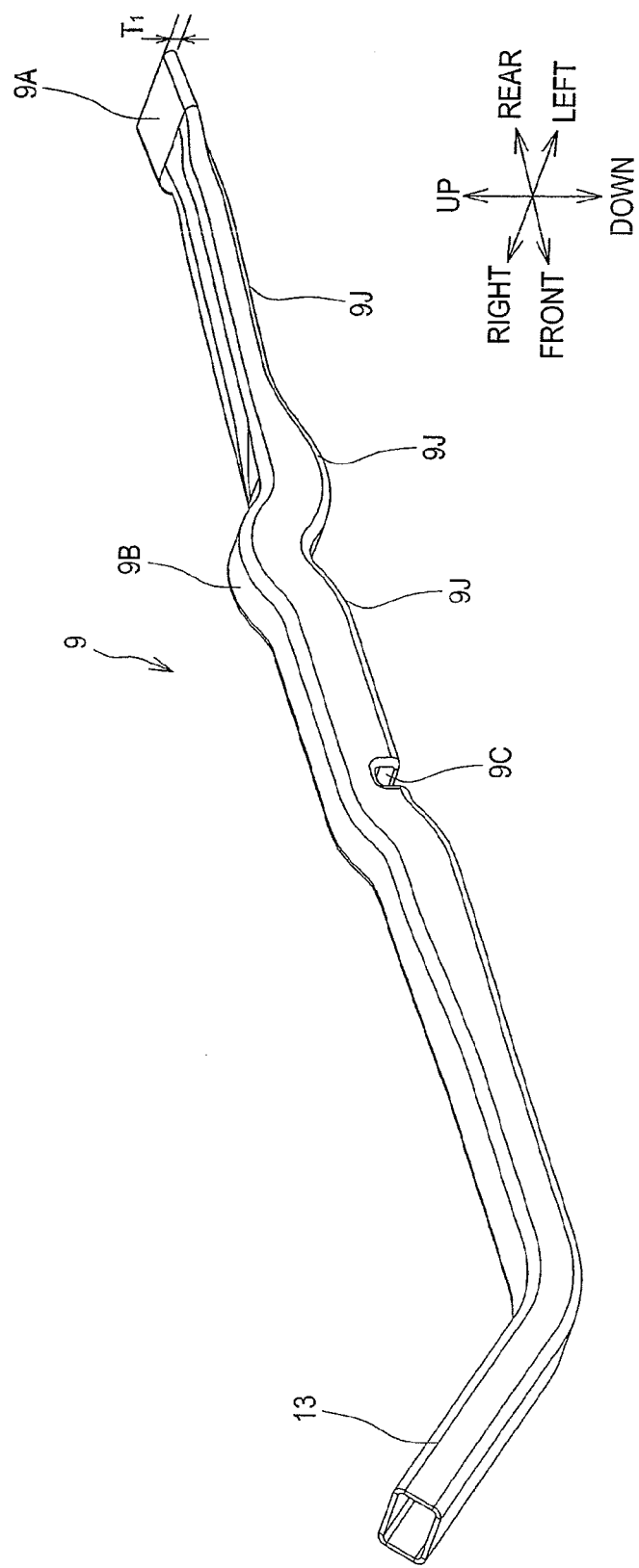
FIG. 11 is a perspective view of the releasing member according to one embodiment.

As shown in FIG. 11, an operation portion 13 is provided at one longitudinal end side of the releasing member 9. The operation portion 13, which is a portion operated directly or indirectly by the vehicle occupant, protrudes from one longitudinal end (in the present embodiment, from a front end) of the movable-side rail 5. The releasing member 9 has a closed sectional shape, and is one piece of metal. The operation portion 13 and the releasing member 9 are integrally formed with each other.

Provided at the other longitudinal end side of the releasing member 9 is a pressing portion 9A. The pressing portion 9A comes in contact with the lock portion 7A from a side of the lid wall 5C. When an operation force is applied to the operation portion 13, the pressing portion 9A presses the lock portion 7A from the restraint position to the release position by means of the operation force.

As shown in FIG. 10, in the releasing member 9, provided between the pressing portion 9A and an engagement groove 9C is a fulcrum portion 9B having a convex shape protruding toward the lid wall 5C. The fulcrum portion 9B contacts the lid wall 5C at a portion on the side of the first elastically deforming portion 7B, to thereby constitute a pivot center of the releasing member 9.

In a state in which the operation force is not applied to the operation portion 13 (a state indicated by solid lines in FIG. 10), the pressing portion 9A is pressed toward the lid wall 5C, i.e., toward a vertically upward side, by means of an elastic force applied from the first elastically deforming portion 7B and the second elastically deforming portion 7C. Thus, in the state in which the operation force is not applied to the operation portion 13, the operation portion 13 is positioned on a vertically lower side.

When the operation force to move the operation portion 13 toward the vertically upward side is applied to the operation portion 13, the pressing portion 9A is displaced about the fulcrum portion 9B, which is the pivot center, toward a vertically downward side (see chain double-dashed lines in FIG. 10). Thus, the lock portion 7A is displaced toward the vertically downward side and brought into the release position. Then, when the aforementioned operation force disappears, the lock portion 7A is restored to the restraint position by means of a restoring force of the first elastically deforming portion 7B and the second elastically deforming portion 7C.

The engagement groove 9C shown in FIG. 11 is one example of an engaged portion with which the engaging portion 74 engages. The engagement groove 9C is a groove that extends in a direction approximately perpendicular to an extending direction of the linear portion 73 and that is open on a side opposite the lid wall 5C. The engagement groove 9C is a groove that extends in a width direction of the releasing member 9 and that is open on the vertically lower side.

Figure 12:
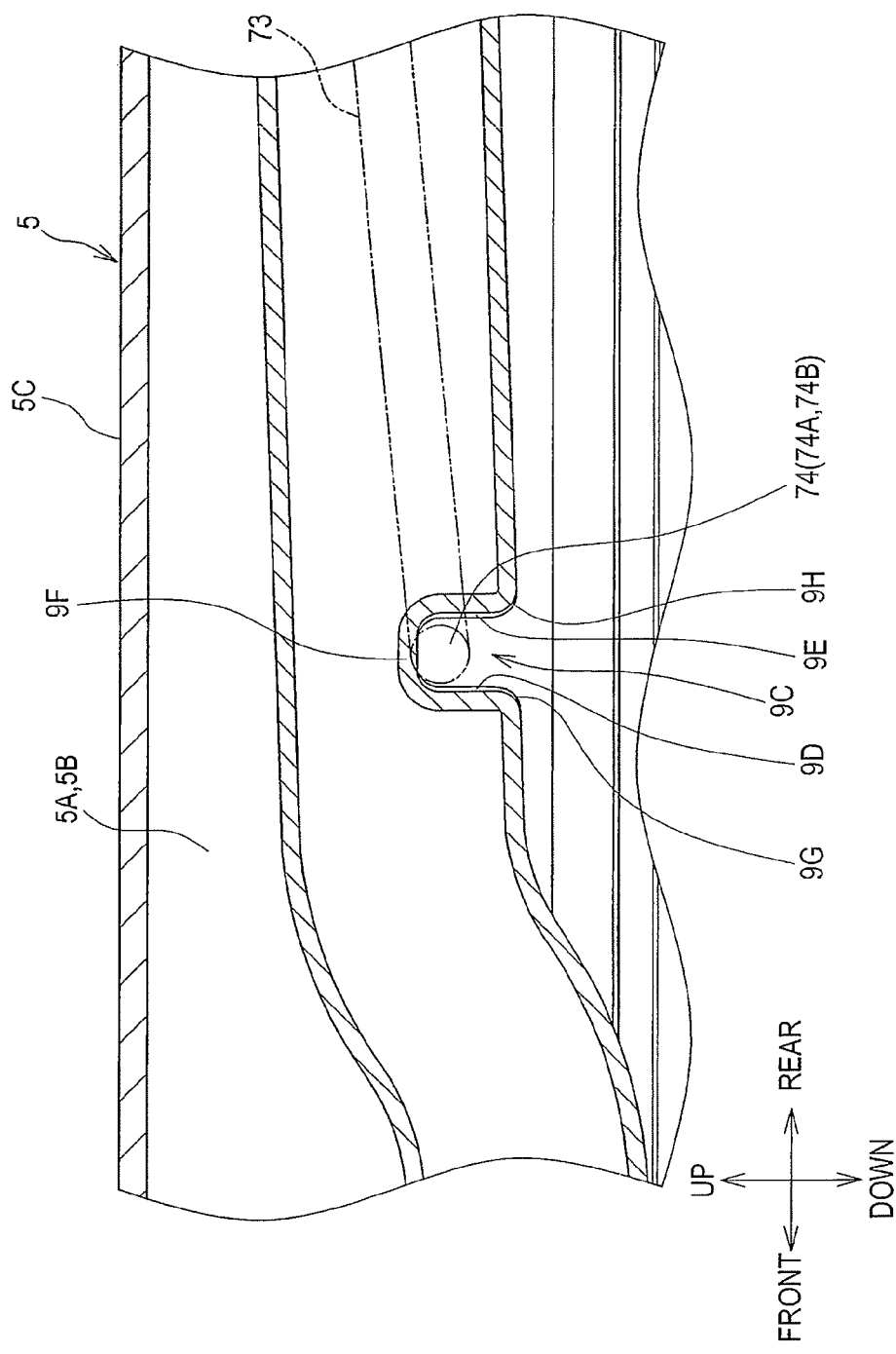
FIG. 12 is an enlarged view of a part A in FIG. 10.

As shown in FIG. 12, the engagement groove 9C comprises a first engaged surface 9D and a second engaged surface 9E. The first engaged surface 9D and the second engaged surface 9E face each other in the extending direction of the linear portion 73 to constitute side walls of the engagement groove 9C.

The first engaged surface 9D is a surface that can contact the engaging portion 74 from one extending-direction end side (in the present embodiment, from the vehicle front side). The second engaged surface 9E is a surface that can contact the engaging portion 74 from the other extending-direction end side (in the present embodiment, from the vehicle rear side).

The first engaging portion 74A and the second engaging portion 74B are positioned at a position allowing for contact with the first engaged surface 9D and the second engaged surface 9E. It is preferred that the leading ends of the first engaging portion 74A and the second engaging portion 74B be each positioned at an extending-direction center of the engagement groove 9C (see FIG. 13).

It is preferred that a length of the first engaging portion 74A in contact with the first engaged surface 9D and the second engaged surface 9E and a length of the second engaging portion 74B in contact with the first engaged surface 9D and the second engaged surface 9E be each approximately one-half of an extending-direction length of the engagement groove 9C.

In a free state in which no force of constraint acts on the linear portion 73 of the first elastically deforming portion 7B, the leading ends of the first engaging portion 74A and the second engaging portion 74B are spaced apart from each other. Thus, in the present embodiment, a position of the engaging portion 74 is limited by utilizing a configuration in which the two side walls 5A and 5B constitute walls approximately perpendicular to a protruding direction of the engaging portion 74.

Figure 13:
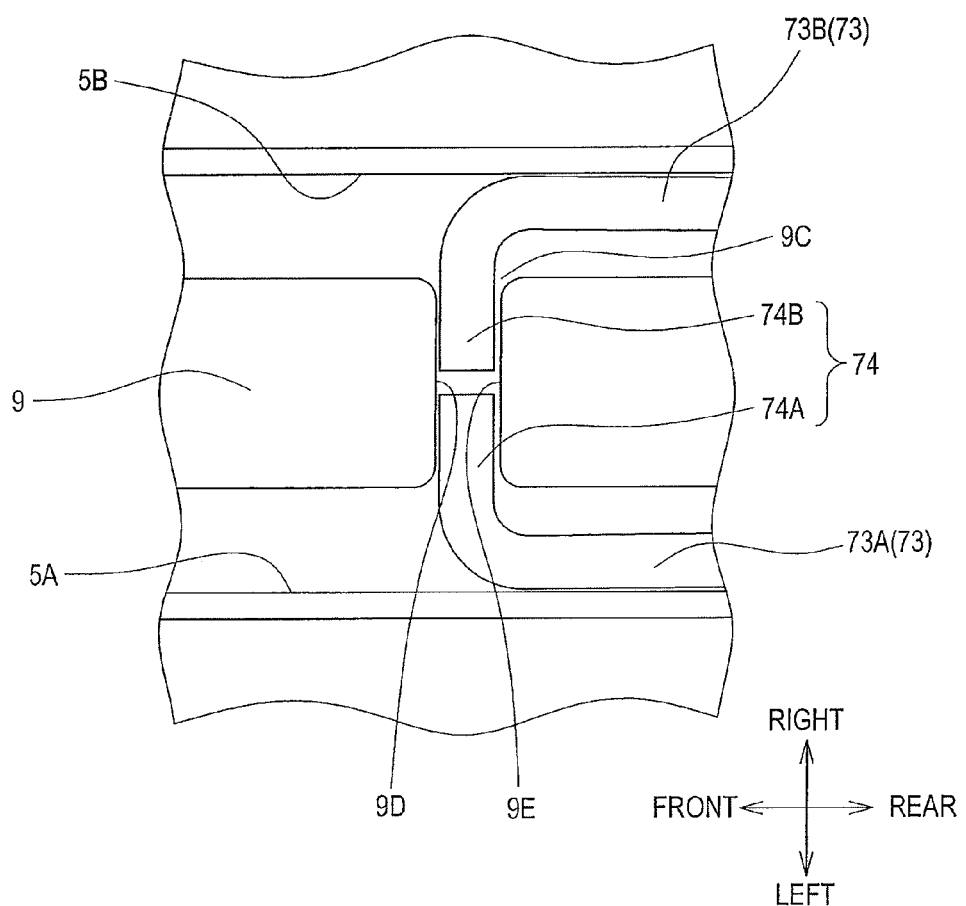
FIG. 13 is an enlarged view of an engagement groove, an engaging portion, and so on according to one embodiment.

In a state in which the lock spring 7 and the releasing member 9 are assembled to the movable-side rail 5, as shown in FIG. 13, the side wall 5A and the first linear portion 73A are in contact with each other, and the side wall 5B and the second linear portion 73B are in contact with each other. Thus, displacement of the first engaging portion 74A and the second engaging portion 74B in such a direction as to be spaced apart from the first engaged surface 9D and the second engaged surface 9E is limited.

As shown in FIG. 12, in the releasing member 9, a sectional shape of a portion where the engagement groove 9C is arranged is a closed sectional shape. A side of a bottom portion 9F of the engagement groove 9C, i.e., vertically upper ends of the first engaged surface 9D and the second engaged surface 9E, is closed by the bottom portion 9F.

The releasing member 9 and the engagement groove 9C, i.e., the releasing member 9 and the first and second engaged surfaces 9D and 9E, are of metal and integrally formed. In the present embodiment, such integral formation is achieved by plastically processing a pipe member of a square tubular shape.

Provided at one height-direction end side (in the present embodiment, at a lower end side) of the first engaged surface 9D and the second engaged surface 9E are, respectively, guide surfaces 9G and 9H, which are inclined with respect to the first engaged surface 9D and the second engaged surface 9E, respectively.

The guide surfaces 9G and 9H are configured such that a distance therebetween becomes larger toward one height-direction end side thereof (in the present embodiment, toward a lower end side thereof) and such that the distance between the guide surfaces 9G and 9H becomes smaller as being measured in a position closer to the first engaged surface 9D and the second engaged surface 9E.

The guide surfaces 9G and 9H are formed integrally with the first engaged surface 9D, the second engaged surface 9E, and the bottom portion 9F when the engagement groove 9C is formed by plastic processing. A position in which the engaging portion 74 contacts with the first engaged surface 9D and the second engaged surface 9E is between one height-direction ends and the other height-direction ends of the first engaged surface 9D and the second engaged surface 9E.

In a portion where the engagement groove 9C is provided, the engaging portion 74 is positioned between one height-direction end (an upper end) and the other height-direction end (a lower end) of the releasing member 9 to contact the first engaged surface 9D and the second engaged surface 9E.

Thus, the engaging portion 74 is held between the first engaged surface 9D and the second engaged surface 9E while being in contact with the bottom portion 9F, and the position in which the engaging portion 74 contacts the first engaged surface 9D and the second engaged surface 9E is between the guide surfaces 9G and 9H and the bottom portion 9F.

As shown in FIG. 9, the movable-side rail 5 comprises a first limiting portion 5G and a second limiting portion 5H. The first limiting portion 5G and the second limiting portion 5H are limiting portions that limit displacement of the releasing member 9 with respect to the movable-side rail 5 in a direction approximately parallel to the protruding direction of the engaging portion 74, i.e., in the width direction.

The first limiting portion 5G and the second limiting portion 5H are provided between the engagement groove 9C and the lock portion 7A. In the present embodiment, in addition to the first limiting portion 5G and the second limiting portion 5H, portions 5J and 5K respectively on the two side walls 5B and 5A facing the pressing portion 9A also function as the aforementioned limiting portions.

The first limiting portion 5G and the second limiting portion 5H are configured with cut-and-raised pieces formed by respectively cutting and raising part of the two side walls 5A and 5B. Each cut-and-raised piece is a portion formed through a "cutting and raising processing" as below.

First, a U-like-shaped through-hole is formed through part of each side walls 5A and 5B by press working or the like. Next, a section surrounded by the through-hole is raised from the corresponding side wall while being bent into an approximately L-like shape by press working or the like, and the section becomes the cut-and-raised piece.

5. Engagement Structure of Second Elastically Deforming Portion

Figure 14A:
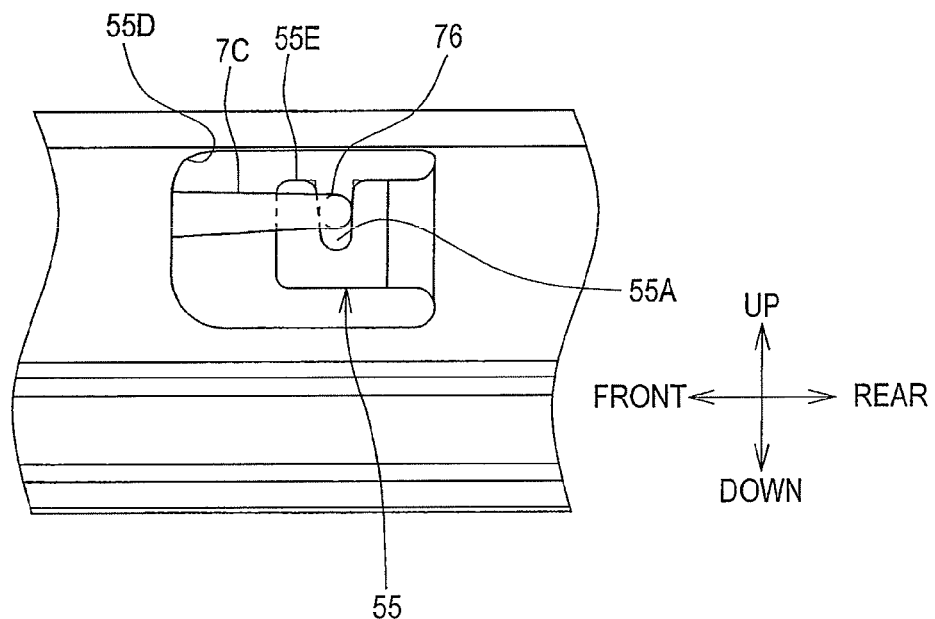
FIG. 14A is a view of an engaging portion according to one embodiment viewed in a horizontal direction.

As shown in FIG. 5, the second elastically deforming portion 7C engages with a cut-and-raised piece 55 provided to the movable-side rail 5. As shown in FIG. 14A, the cut-and-raised piece 55 comprises an engaged portion 55A. The engaged portion 55A is a protruding piece with which the engaging portion 76 is caught and engaged.

Figure 14B:
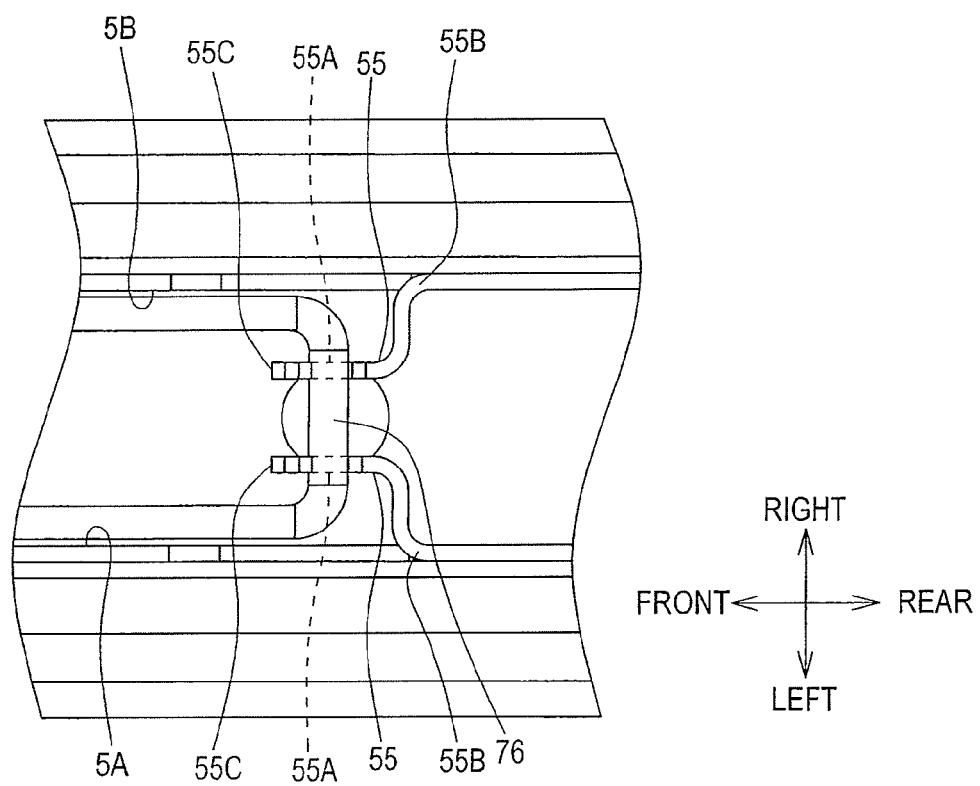
FIG. 14B is a view of the engaging portion according to one embodiment viewed in a vertical direction.

As shown in FIG. 14B, the cut-and-raised piece 55 is provided to each of the two side walls 5A and 5B. The cut-and-raised piece 55 is shaped into an approximately L-like shape by being cut and raised such that a joining portion 55B at which the cut-and-raised piece 55 and each of the side walls 5A and 5B are joined together is positioned on the other longitudinal end side of the movable-side rail 5 (in the present embodiment, on the vehicle rear side) with respect to a corresponding leading-end portion 55C.

Thus, as shown in FIG. 14A, a through-hole 55D penetrating each of the two side walls 5A and 5B is generated in a specified area thereof ranging from the joining portion 55B toward the one longitudinal end side of the movable-side rail 5 (in the present embodiment, toward the vehicle front side) in each of the two side walls 5A and 5B. The through-hole 55D corresponds to the cut-and-raised hole.

The engaged portion 55A is a U-like-shaped recess portion recessed in a direction from an upper end 55E of the cut-and-raised piece 55 toward the open side of the movable-side rail 5 (toward the vertically lower side). The engaging portion 76 runs through the engaged portion 55A in a thickness direction of the cut-and-raised piece 55 (in the present embodiment, in the width direction).

The cut-and-raised piece 55 is configured with a protruding piece extending from the vehicle rear side to the vehicle front side, and the engaging portion 76 is caught with the cut-and-raised piece 55 from a vertically upper end thereof and engages with the cut-and-raised piece 55.

6. Structure for Assembling Releasing Member to Movable-Side Rail

<Assembling Structure>

As described above, the releasing member 9 is provided between the first elastically deforming portion 7B and the lid wall 5C. Further, as shown in FIG. 9, the movable-side rail 5 comprises a restricting portion 56 provided on the one longitudinal end side thereof (in the present embodiment, on the vehicle front side).

As shown in FIG. 15, the restricting portion 56 is a portion configured to provide a space through which an insertion-side end of the releasing member 9 can be inserted between the first elastically deforming portion 7B and the lid wall 5C. The insertion-side end means an end of the releasing member 9 located on a side of the lock portion 7A.

In other words, the restricting portion 56 is a portion configured to inhibit a distance between the first elastically deforming portion 7B and the lid wall 5C from being equal to or less than an end height dimension T1 of the releasing member 9. Specifically, in a state in which the releasing member 9 is not assembled to the movable-side rail 5, the first elastically deforming portion 7B is in contact with the restricting portion 56 as shown by chain double-dashed lines in FIG. 15. Thus, the distance between the first elastically deforming portion 7B and the lid wall 5C is inhibited from being smaller.

As shown in FIG. 11, the end height dimension T1 is a height-direction dimension of the releasing member 9 at the end located on the side of the lock portion 7A. The end height dimension T1, i.e., a height dimension of the pressing portion 9A, is a height dimension of a portion whose height dimension is smallest in the releasing member 9. The height dimension of the releasing member 9 becomes larger in a direction from the pressing portion 9A toward the fulcrum portion 9B.

As shown in FIG. 15, the restricting portion 56 is provided to each of the two side walls 5A and 5B. Provided to the side wall 5A is a first restricting portion 56A, and provided to the side wall 5B is a second restricting portion 56B.

The first restricting portion 56A is configured with a protruding piece protruding from the side wall 5A toward the side wall 5B. The second restricting portion 56B is configured with a protruding piece protruding from the side wall 5B toward the side wall 5A.

The protruding pieces constituting the first restricting portion 56A and the second restricting portion 56B are inclined with respect to the height direction of the seat sliding device 1. The first restricting portion 56A and the second restricting portion 56B are cut-and-raised pieces formed by cutting and raising part of the two side walls 5A and 5B, respectively. A base portion 56C of each of the first restricting portion 56A and the second restricting portion 56B is located vertically upper than a leading end 56D of each of the first restricting portion 56A and the second restricting portion 56B.

Thus, the first restricting portion 56A and the second restricting portion 56B are inclined with respect to the height direction such that the closer to the base portion 56C, the closer to the side walls 5A and 5B, respectively. The first restricting portion 56A and the second restricting portion 56B are hereinafter referred to as the restricting portion 56 when referred to collectively.

As shown in FIG. 9, the restricting portion 56 is provided at a position allowing for contact with the linear portion 73 and the extending-direction leading end portion of the linear portion 73. Further provided to the releasing member 9 is a sliding contact portion 9J with which the engaging portion 74 is slidingly contactable.

The sliding contact portion 9J is provided to a portion that is on a side of the first elastically deforming portion 7B in the releasing member 9 and that extends from the side of the lock portion 7A to the engagement groove 9C. Specifically, as shown in FIG. 11, width-direction both ends of an underside of the releasing member 9 extending from the pressing portion 9A to the engagement groove 9C each correspond to the sliding contact portion 9J.

<Assembling Method>

In an operation of assembling the releasing member 9 to the movable-side rail 5, an operator first assembles the lock spring 7 to the movable-side rail 5 with the lid wall 5C of the movable-side rail 5 positioned on a vertically lower side.

Specifically, the operator fits the engagement portions 71 and 72 of the lock portion 7A into the corresponding cut-outs 51 and 52, and engages the engaging portion 76 of the second elastically deforming portion 7C with the engaged portion 55A. At this time, the first elastically deforming portion 7B is brought into a state in which the leading end portion of the linear portion 73 and the linear portion 73 are in contact with the restricting portion 56 (see FIG. 15).

Next, the operator inserts the pressing portion 9A of the releasing member 9 into an interspace between the lock spring 7 and the lid wall 5C. At this time, the releasing member 9 is inserted toward the lock portion 7A with the engaging portion 74 being in sliding contact with the sliding contact portion 9J and with a top portion of the fulcrum portion 9B being in sliding contact with the lid wall 5C.

Then, when the engaging portion 74 is fitted into the engagement groove 9C, the operation of inserting the releasing member 9 ends. When the engaging portion 74 is fitted into the engagement groove 9C, a force required for insertion is increased sharply, and thus, the operator can easily detect that the engaging portion 74 has been fitted into the engagement groove 9C.

7. Features of Seat Sliding Device

In the present embodiment, as shown in FIG. 13, the engaging portion 74 is configured to be held between the first engaged surface 9D and the second engaged surface 9E. This enables a configuration in which, even when a force in a direction to pull out the releasing member 9, i.e., a pull-out force, acts on the releasing member 9, a bending moment to increase an angle between the engaging portion 74 and the linear portion 73 is less likely to act on the engaging portion 74.

Thus, in the present embodiment, a configuration is achieved in which the pull-out force is not compensated by a bending stress generated at a base portion of the engaging portion 74, i.e., a joining portion at which the engaging portion 74 and the linear portion 73 are joined together, but the pull-out force can be compensated by a shear force generated at a section of the base portion. As a result, it is possible to obtain the seat sliding device 1 in which a significant decrease in an engaging force can be inhibited.

In the releasing member 9, the sectional shape of the portion where the engagement groove 9C is arranged is a closed sectional shape, and the engagement groove 9C and the releasing member 9 are one piece of metal. This makes it possible to form the first engaged surface 9D and the second engaged surface 9E easily and to improve stiffness of the releasing member 9.

The first engaging portion 74A and the second engaging portion 74B are provided at a position allowing for contact with the first engaged surface 9D and the second engaged surface 9E. This achieves the configuration in which the leading ends of the first engaging portion 74A and the second engaging portion 74B are within the engagement groove 9C. Thus, a configuration is enabled in which a bending moment to increase an angle between the first engaging portion 74A and the first linear portion 73A and an angle between the second engaging portion 74B and the second linear portion 73B is less likely to act on the engaging portion 74.

As shown in FIG. 12, the position in which the engaging portion 74 contacts the first engaged surface 9D and the second engaged surface 9E is between the one height-direction end and the other height-direction end of the releasing member 9. This makes it possible to reduce a height dimension of the movable-side rail 5, and thus of the seat sliding device 1, as compared with a configuration in which the engaging portion 74 engages with the releasing member 9 at a position displaced from the releasing member 9 in the height direction.

As shown in FIG. 13, contact of the two side walls 5A and 5B with the linear portion 73 inhibits the engaging portion 74 from being displaced in a direction away from the first engaged surface 9D and the second engaged surface 9E. This reliably enables the configuration in which the bending moment to increase the angle between the engaging portion 74 and the linear portion 73 is less likely to act on the engaging portion 74.

As shown in FIG. 9, the first limiting portion 5G and the second limiting portion 5H are provided between the first and/or second engaged surfaces 9D and/or 9E and the lock portion 7A. This inhibits the releasing member 9 from being displaced in a direction approximately parallel to the protruding direction of the engaging portion 74 with respect to the movable-side rail 5. Thus, the configuration is reliably enabled in which the bending moment to increase the angle between the engaging portion 74 and the linear portion 73 is less likely to act on the engaging portion 74.

As shown in FIG. 12, the inclined guide surfaces 9G and 9H are each provided at the one height-direction end side (in the present embodiment, at the lower end side) of the first engaged surface 9D and the second engaged surface 9E, respectively. This enables easy engagement of the engaging portion 74 with the engagement groove 9C.

As shown in FIG. 15, the restricting portion 56 is provided that inhibits the distance between the first elastically deforming portion 7B and the lid wall 5C from being equal to or less than the end height dimension T1 of the releasing member 9. This enables the operator to easily insert the releasing member 9 into the movable-side rail 5 from the one longitudinal end side of the movable-side rail 5 and to assemble the releasing member 9 to the movable-side rail 5.

When the operator inserts the releasing member 9 into the movable-side rail 5, if the first elastically deforming portion 7B is closer to the lid wall 5C, the releasing member 9 cannot be inserted into the movable-side rail 5 because the first elastically deforming portion 7B becomes an obstacle.

However, in the present embodiment, the restricting portion 56 that inhibits the distance between the first elastically deforming portion 7B and the lid wall 5C from being equal to or less than the end height dimension T1 of the releasing member 9 is provided at the one longitudinal end side of the movable-side rail 5.

Thus, it is possible to inhibit the first elastically deforming portion 7B from becoming the obstacle when the releasing member 9 is inserted into the movable-side rail 5. As a result, easy insertion of the releasing member 9 into the movable-side rail 5 can be achieved.

The restricting portion 56 is configured with the protruding pieces protruding from the side wall 5A toward the side wall 5B and from the side wall 5B toward the side wall 5A, and the protruding pieces constituting the restricting portion 56 are inclined with respect to the height direction.

Due to such a configuration, the linear portions 73A and 73B respectively in contact with the first and second restricting portions 56A and 56B may be respectively held between the first restricting portion 56A and the side wall 5A and between the second restricting portion 56B and the side wall 5B. Thus, it can be more reliably inhibited that the first elastically deforming portion 7B hinders insertion of the releasing member 9.

The sliding contact portion 9J, with which the engaging portion 74 is slidingly contactable, is provided to the portion that is on the side of the first elastically deforming portion 7B in the releasing member 9 and that extends from the side of the lock portion 7A to the engagement groove 9C. This enables easy insertion of the releasing member 9 into the movable-side rail 5.

As shown in FIG. 14B, the cut-and-raised piece 55 is formed such that the joining portion 55B at which the cut-and-raised piece 55 and each of the side walls 5A and 5B are joined together is positioned on the other longitudinal end side of the movable-side rail 5 with respect to the corresponding leading-end portion 55C.

Since the seat sliding device 1 is mounted to a vehicle or the like such that the direction approximately parallel to the direction from the side of the lid wall 5C toward the open side of the movable-side rail 5 corresponds to the vertical direction, a direction of the "required cut-and-raised length" corresponds to a horizontal direction, i.e., the longitudinal direction of the movable-side rail 5.

Accordingly, it can be inhibited that the cut-and-raised hole extends over the lid wall 5C, and thus, reduction of the vertical dimension of the movable-side rail 5 is enabled while inhibiting reduction of the flexural rigidity of the movable-side rail 5.

Furthermore, since the cut-and-raised piece 55 is formed such that the joining portion 55B at which the cut-and-raised piece 55 and each of the side walls 5A and 5B are joined together is positioned on the other longitudinal end side of the movable-side rail 5 with respect to the corresponding leading-end portion 55C, it can be inhibited that the cut-and-raised piece 55 becomes the obstacle when the second elastically deforming portion 7C engages with the engaged portion 55A and when the second elastically deforming portion 7C is elastically deformed.

OTHER EMBODIMENTS

The first engaged surface 9D and the second engaged surface 9E according to the above-described embodiment constitute wall surfaces continuous from one end to the other end in the width direction of the releasing member 9. However, the present disclosure is not limited to this, and a configuration may be employed in which, for example, a width-direction middle part of each of the first engaged surface 9D and the second engaged surface 9E is cut off.

Specifically, since the engaging portion 74 only has to have a configuration to be held between the first engaged surface 9D and the second engaged surface 9E (hereinafter referred to as a held configuration), it is sufficient that a width-direction length of the first engaged surface 9D and the second engaged surface 9E is a length that achieves the held configuration. Such length is, for example, at least equal to an outermost diameter dimension of the engaging portion 74 or greater.

In the above-described embodiment, the first and second engaged surfaces 9D and 9E are formed integrally with the releasing member 9. However, the present disclosure is not limited to this, and a configuration such as, for example, following configurations (a) to (c) may be employed.

(a) a configuration in which the first and second engaged surfaces 9D and 9E, which have been produced separately from the releasing member 9, are joined by welding or the like, or assembled and fixed by a mechanical fastener such as a screw (b) a configuration in which, in a case where the releasing member 9 is configured to have a C-like or U-like open sectional shape similarly to the movable-side rail 5, side walls of the releasing member 9 are cut and raised to thereby achieve integral formation of the first and second engaged surfaces 9D and 9E and the releasing member 9

(c) a configuration in which, in the case where the releasing member 9 is configured to have a C-like or U-like open sectional shape similarly to the movable-side rail 5, side walls of the releasing member 9 are subjected to burring or the like to thereby achieve integral formation of the first and second engaged surfaces 9D and 9E and the releasing member 9

In the above-described embodiment, the sectional shape of the portion where the engagement groove 9C is arranged in the releasing member 9 is a closed sectional shape. However, the present disclosure is not limited to this, and the releasing member 9 having a C-like or U-like open sectional shape may be employed.

In the above-described embodiment, the first engaging portion 74A and the second engaging portion 74B are positioned at the position allowing for contact with the first engaged surface 9D and the second engaged surface 9E, and the leading ends of the first engaging portion 74A and the second engaging portion 74B are each positioned at the extending-direction center of the engagement groove 9C.

However, the present disclosure is not limited to this, and a configuration may be employed in which, for example, the linear portion 73 is configured with a single member and the engaging portion 74 provided to such a linear portion 73 can contact the first engaged surface 9D and the second engaged surface 9E.

The engaging portion 74 according to the above-described embodiment comprises the first engaging portion 74A and the second engaging portion 74B.

However, the present disclosure is not limited to this, and a configuration in which only either the first engaging portion 74A or the second engaging portion 74B is provided or a configuration similar to that of the engaging portion 76 may be employed. Alternatively, the engaging portion 76 may be configured with two portions similarly to the engaging portion 74.

In the above-described embodiment, the two side walls 5A and 5B constitute wall surfaces approximately perpendicular to the protruding direction of the engaging portion 74 to thereby limit the position of the engaging portion 74. However, the present disclosure is not limited to this and, for example, a portion to limit the position of the engaging portion 74 may be provided separately.

In the above-described embodiment, the guide surfaces 9G and 9H, which are respectively inclined with respect to the first engaged surface 9D and the second engaged surface 9E, are respectively provided at the one height-direction end side of the first engaged surface 9D and the second engaged surface 9E. However, the present disclosure is not limited to this, and a configuration without the guide surfaces 9G and 9H may be employed.

In the above-described embodiment, the position in which the engaging portion 74 contacts the first engaged surface 9D and the second engaged surface 9E is between the upper end and the lower end of the releasing member 9 in the portion where the engagement groove 9C is provided. However, the present disclosure is not limited to this.

For example, a configuration may be employed in which the upper ends or the lower ends of the first engaged surface 9D and the second engaged surface 9E extend to a position displaced in the height direction with respect to the releasing member 9 and the engaging portion 74 contacts such an extended portion.

In the above-described embodiment, the first limiting portion 5G and the second limiting portion 5H are provided to the movable-side rail 5. However, the present disclosure is not limited to this, and a configuration without the first limiting portion 5G or the second limiting portion 5H may be employed.

The cut-and-raised piece 55 according to the above-described embodiment is shaped into the approximately L-like shape by being cut and raised such that the joining portion 55B at which the cut-and-raised piece 55 and each of the side walls 5A and 5B are joined together is positioned on the other longitudinal end side of the movable-side rail 5 with respect to the corresponding leading-end portion 55C.

However, the present disclosure is not limited to this, and a configuration may be employed in which, for example, the cut-and-raised piece 55 is formed by being cut and raised such that the joining portion 55B at which the cut-and-raised piece 55 and each of the side walls 5A and 5B are joined together is positioned on the one longitudinal end side of the movable-side rail 5 with respect to the corresponding leading-end portion 55C.

In the above-described embodiment, the cut-and-raised piece 55 is provided to each of the side walls 5A and 5B. However, the present disclosure is not limited to this, and it is sufficient that the cut-and-raised piece 55 is provided to either one of the side wall 5A or the side wall 5B.

As shown in FIG. 15, the restricting portion 56 according to the above-described embodiment is provided to each of the two side walls 5A and 5B. However, the present disclosure is not limited to this, and a configuration in which the restricting portion 56 is provided to either one of the side wall 5A or the side wall 5B, or a configuration without the restricting portion 56 may be employed.

The restricting portion 56 according to the above-described embodiment is provided at the position allowing for contact with the linear portion 73 and the extending-direction leading end portion of the linear portion 73. However, the present disclosure is not limited to this, and a configuration may be employed in which, for example, the restricting portion 56 can contact only either one of the linear portion 73 or the extending-direction leading end portion of the linear portion 73.

Each restricting portion 56 according to the above-described embodiment is configured with the cut-and-raised piece formed by cutting and raising part of the side walls 5A and 5B, and is inclined with respect to the height direction. However, the present disclosure is not limited to this and, for example, each restricting portion 56 may be configured with a separate member and may be assembled to the movable-side rail 5.

In the above-described embodiment, the sliding contact portion 9J is provided on the portion extending from the side of the lock portion 7A to the engagement groove 9C. However, the present disclosure is not limited to this, and the sliding contact portion 9J may be omitted.

The lock spring 7 according to the above-described embodiment is one piece with the first elastically deforming portion 7B, the lock portion 7A, and the second elastically deforming portion 7C formed by bending the single linear material.

However, the present disclosure is not limited to this and, for example, the first elastically deforming portion 7B, the lock portion 7A, and the second elastically deforming portion 7C may be produced as separate parts and may be assembled together and integrated. Alternatively, a configuration without the second elastically deforming portion 7C may be employed.

The linear material constituting the lock spring 7 according to the above-described embodiment has a circular sectional shape. However, the present disclosure is not limited to this, and the lock spring 7 may be configured with a linear material having, for example, a rectangular sectional shape.

The first elastically deforming portion 7B and the second elastically deforming portion 7C are elastically deforming portions respectively comprising the linear portions 73 and 75 of a linear shape. However, the present disclosure is not limited to this, and the first elastically deforming portion 7B and the second elastically deforming portion 7C each may be configured with, for example, a strip-plate-like flat spring.

The releasing member 9 according to the above-described embodiment is one piece formed integrally with the operation portion 13. However, the present disclosure is not limited to this, and a configuration may be employed in which, for example, the operation portion 13 is a separate part detachable from the releasing member 9, or in which a loop handle or the like, instead of the operation portion 13, can be attached to the releasing member 9.

The fixed-side rail 3 and the movable-side rail 5 according to the above-described embodiment is of metal. However, the present disclosure is not limited to this, and the fixed-side rail 3 and the movable-side rail 5 may be made of other material such as resin.

In the above-described embodiment, the explanation has been made about the seat sliding device that slidably supports the rear seat of a car. However, the present disclosure is not limited to this, and features of the present disclosure can be applied to a front seat of a car and a vehicle seat or the like, such as a seat for a railroad vehicle, a seat for an airplane, and a seat for a ship.

The present disclosure is not limited to the above-described embodiments as long as the present disclosure meets the gist of the disclosure recited in the claims.

What is claimed is:

1. A seat sliding device that slidably supports a seat, the seat sliding device comprising:
   a fixed-side rail;
   a movable-side rail that is slidable with respect to the fixed-side rail and that is configured to support the seat, the movable-side rail comprising an open-sectional portion comprising two side walls and a lid wall that couples the two side walls to each other;
   a lock portion that is displaceable between a restraint position, in which sliding of the movable-side rail with respect to the fixed-side rail is restrained, and a release position, in which such restraint is eliminated;
   a first elastically deforming portion that is elastically deformable between a state supporting the lock portion in the restraint position and a state supporting the lock portion in the release position, the first elastically deforming portion being housed in the movable-side rail;
   a second elastically deforming portion that is housed in the movable-side rail so as to be on a side opposite the first elastically deforming portion across the lock portion, the second elastically deforming portion being elastically deformable between a state supporting the lock portion in the restraint position and a state supporting the lock portion in the release position;
   a releasing member that is configured to switch a deformed state of the first elastically deforming portion and the second elastically deforming portion, the releasing member extending from a side of the first elastically deforming portion toward one longitudinal end side of the movable-side rail and being engaged with the first elastically deforming portion; and
   a protruding piece that is provided to at least one side wall of the two side walls and that protrudes toward the other side wall, the protruding piece comprising an engaged portion with which the second elastically deforming portion engages,
   wherein the protruding piece is configured such that a joining portion at which the protruding piece and the side wall are joined together is positioned on the other longitudinal end side of the movable-side rail with respect to a leading-end portion of the protruding piece, and
   wherein the side wall contains, in a specified area thereof ranging from the joining portion toward the one longitudinal end side, a through-hole penetrating the side wall.

2. The seat sliding device according to claim 1,
   wherein the engaged portion is a U-like-shaped recess portion recessed in a direction from an upper end, which is an end of the protruding piece positioned on a side of the lid wall, toward an open side of the movable-side rail, and
   wherein an engaging portion in the second elastically deforming portion that engages with the engaged portion runs through the engaged portion in a thickness direction of the protruding piece.

* * * * *